(12) United States Patent
Stenberg et al.

(10) Patent No.: US 10,197,804 B2
(45) Date of Patent: Feb. 5, 2019

(54) REFRACTIVE COATING FOR DIFFRACTIVE OPTICAL ELEMENTS

(71) Applicant: Microsoft Technology Licensing, LLC, Redmond, WA (US)

(72) Inventors: Petri Antero Stenberg, Niittylahti (FI); Jani Kari Tapio Tervo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 15/137,067

(22) Filed: Apr. 25, 2016

(65) Prior Publication Data

US 2017/0307886 A1      Oct. 26, 2017

(51) Int. Cl.
*G02B 5/18* (2006.01)
*G02B 27/01* (2006.01)
*F21V 8/00* (2006.01)
*G02B 27/00* (2006.01)

(52) U.S. Cl.
CPC ....... *G02B 27/0172* (2013.01); *G02B 5/1814* (2013.01); *G02B 5/1842* (2013.01); *G02B 5/1847* (2013.01); *G02B 6/0016* (2013.01); *G02B 6/0035* (2013.01); *G02B 6/0076* (2013.01); *G02B 27/0081* (2013.01); *G02B 6/0038* (2013.01); *G02B 2027/0112* (2013.01); *G02B 2027/0116* (2013.01); *G02B 2027/0118* (2013.01); *G02B 2027/0123* (2013.01)

(58) Field of Classification Search
CPC ..... G02B 5/18; G02B 5/1847; G02B 27/4277
USPC ............ 359/34, 569, 566, 576; 385/37, 147
See application file for complete search history.

(56) References Cited

U.S. PATENT DOCUMENTS

| | | | |
|---|---|---|---|
| 5,323,266 A | * | 6/1994 | Flint .................... G02B 5/1847 359/566 |
| 6,882,452 B2 | | 4/2005 | Decker et al. |
| 7,157,135 B2 | | 1/2007 | Decker et al. |

(Continued)

FOREIGN PATENT DOCUMENTS

| | | |
|---|---|---|
| FR | 2942549 A1 | 8/2010 |
| GB | 2493846 A | 2/2013 |

(Continued)

OTHER PUBLICATIONS

Beranek, et al., "Physical Design and Fabrication of a Multiple Element Slab Waveguide Spectrograph for Multimode Fiber-Optic Wdm Systems", In Proceedings of IEEE Transactions on Components, Hybrids, and Manufacturing Technology, vol. 16, Issue 5, Aug. 1993, pp. 511-516.

(Continued)

*Primary Examiner* — Audrey Y Chang
(74) *Attorney, Agent, or Firm* — Arent Fox LLP

(57) ABSTRACT

A waveguide configured for use with a near-eye display (NED) device can include a light-transmissive substrate configured to propagate light rays through total internal reflection and a diffractive optical element (DOE) on a surface of the substrate that is configured to input and/or output light rays to and/or from the substrate. According to some embodiments the DOE can include a diffraction grating made of first material having a first refractive index and a coating of a second material over the diffraction grating, the second material having a second refractive index that is not equal to the first refractive index.

18 Claims, 19 Drawing Sheets

(56) References Cited

U.S. PATENT DOCUMENTS

| | | | |
|---|---|---|---|
| 7,639,911 B2 | 12/2009 | Lee et al. | |
| 7,880,943 B2 | 2/2011 | Kittler et al. | |
| 8,900,899 B2 | 12/2014 | Rabiei | |
| 9,329,325 B2 * | 5/2016 | Simmonds | G02B 6/0038 |
| 9,519,089 B1 * | 12/2016 | Brown | G02B 5/18 |
| 2004/0081399 A1 | 4/2004 | Zheng et al. | |
| 2006/0093793 A1 * | 5/2006 | Miyakawa | B29D 11/0073 |
| | | | 428/172 |
| 2007/0071061 A1 | 3/2007 | Pietra et al. | |
| 2010/0277803 A1 * | 11/2010 | Pockett | G02B 27/4277 |
| | | | 359/567 |
| 2012/0044572 A1 | 2/2012 | Simmonds et al. | |
| 2013/0250207 A1 | 9/2013 | Bohn | |
| 2015/0063753 A1 | 3/2015 | Evans et al. | |
| 2015/0125109 A1 | 5/2015 | Robbins et al. | |

FOREIGN PATENT DOCUMENTS

| | | |
|---|---|---|
| JP | S60077476 A | 5/1985 |
| WO | 2012028809 A1 | 3/2012 |

OTHER PUBLICATIONS

"International Search Report and Written Opinion Issued in PCT Application No. PCT/US2017/028232", dated Oct. 12, 2017, 13 Pages.

* cited by examiner

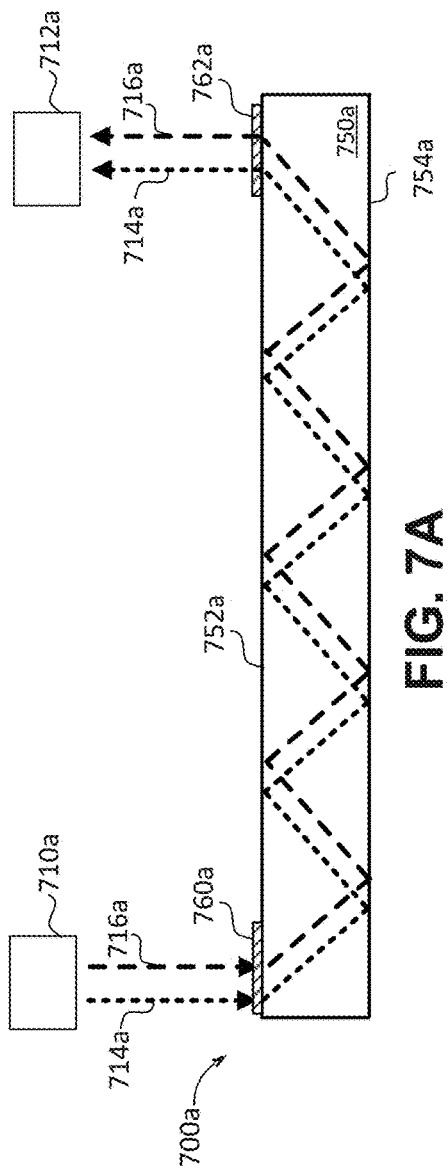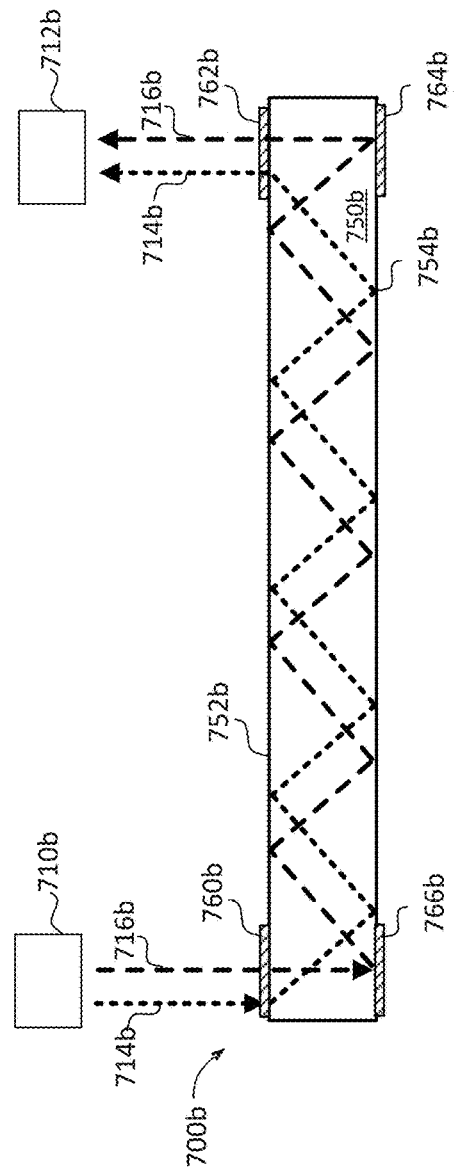

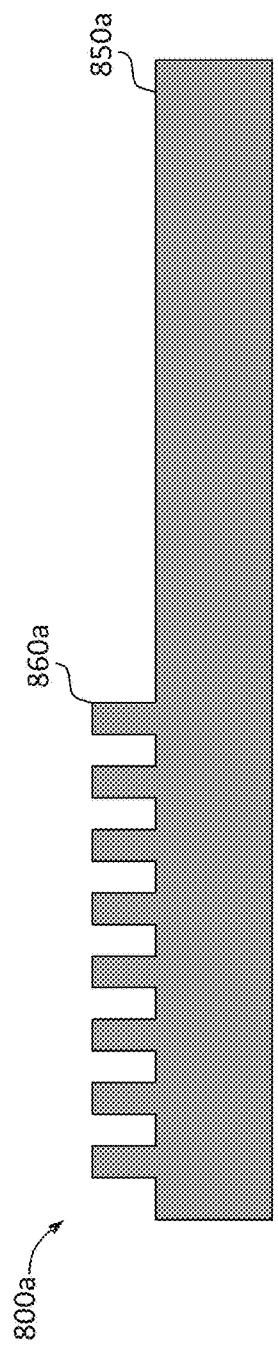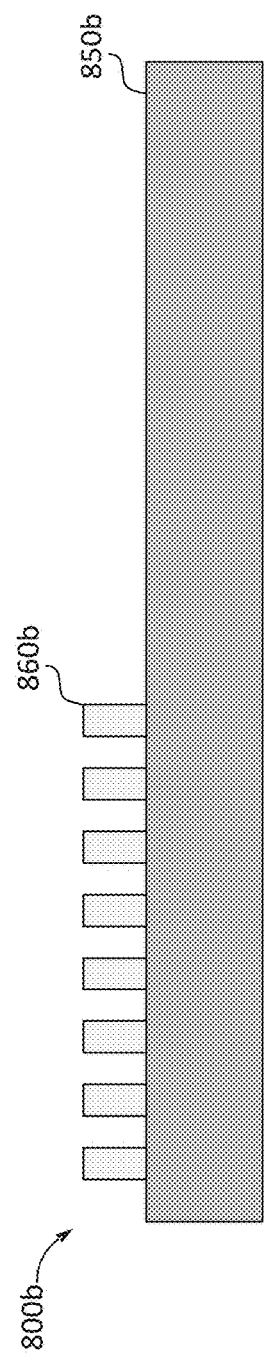
FIG. 8A
FIG. 8B

REFRACTIVE COATING FOR DIFFRACTIVE OPTICAL ELEMENTS

BACKGROUND

Display technology is advancing in the areas of augmented reality (AR) and virtual reality (VR) to provide users with more immersive visual experiences. For example, in some AR applications, generated imagery is displayed to a user via a transparent display that also allows the user to view the surrounding physical environment. The generated imagery enhances or augments the user's experience or knowledge of the surrounding physical environment.

In some implementations an optical waveguide can be used to spatially translate a generated image from one position to another position in an optical system. For example, in a near-eye display (NED) device, an optical waveguide can spatially translate propagating light rays representing imagery generated by a microdisplay and convey them toward an eye of a user. Such technology may be incorporated into an NED device in the form of eyeglasses, goggles, a helmet, a visor, or some other type of eyewear.

SUMMARY

The technique introduced here includes an optical waveguide and a method of manufacturing such a waveguide and an optical waveguide display. In various embodiments the optical waveguide can include a light-transmissive substrate configured for use in a near-eye display (NED) device. The substrate includes a plurality of internally reflective surfaces, where the substrate is made of a first material having a first refractive index. The optical waveguide can further include a diffractive optical element (DOE) formed on a first surface of the plurality of surfaces of the substrate, where the DOE can be configured to input light rays to the substrate or output light rays from the substrate. The DOE in various embodiments can include a diffraction grating made of a second material having a second refractive index; and a coating over the diffraction grating made of a third material having a third refractive index, wherein the second refractive index is not equal to the third refractive index. Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 7A illustrates a waveguide pupil relay that includes DOEs according to a first embodiment.

FIG. 7B illustrates a waveguide pupil relay that includes DOEs according to a second embodiment.

FIG. 8A shows a cross-sectional view of an example DOE that includes a diffraction grating without a coating, according to a first embodiment.

FIG. 8B shows a cross-sectional view of an example DOE that includes a diffraction grating without a coating, according to a second embodiment.

DETAILED DESCRIPTION

Figure 1:
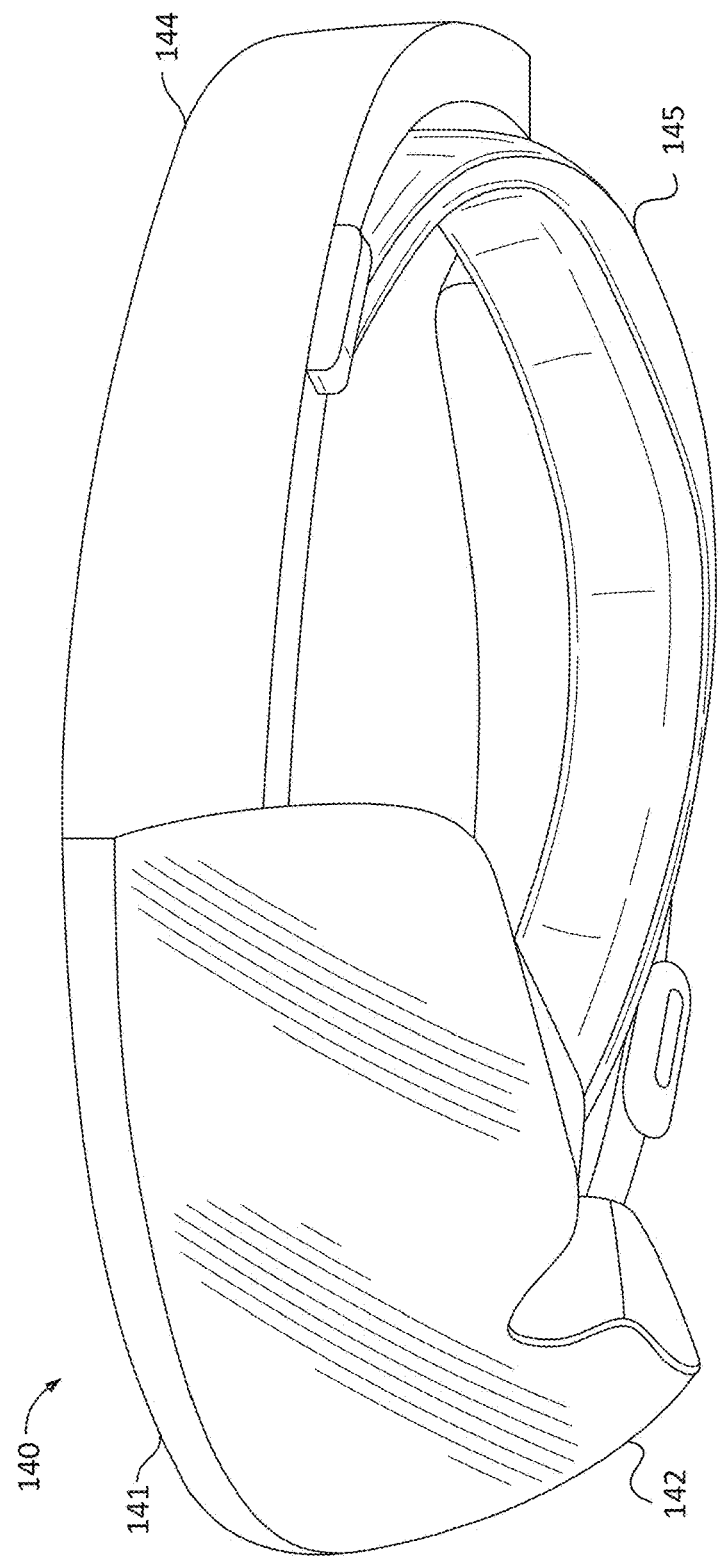
FIG. 1 shows an example of a near-eye display (NED) device in which the technique introduced here can be incorporated.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The following description generally assumes that a "user" of a display device is a human. Note, however, that a display device according to the embodiments disclosed herein can potentially be used by a user that is not human, such as a machine or an animal. Hence, the term "user" can refer to any of those possibilities, except as may be otherwise stated or evident from the context. Further, except where stated otherwise, the term "eye" is used herein as a general term to refer to an optical receptor of any type of user of a display device, and therefore can refer to a human eye, an animal eye, or a machine-implemented optical sensor designed to detect an image in a manner analogous to a human eye.

Some NED devices include optical systems for spatially translating a pupil from one position to another position, for example from a microdisplay imager to an eye of a user. This optical system is sometimes referred to as a pupil relay system. An NED device can include one or more transparent waveguides arranged so that they are located directly in front of each eye of the user when the NED device is worn by the user, to project light representing generated images into the eye of the user. With such a configuration, images generated by the NED device can be overlaid on the user's view of the surrounding physical environment. Waveguides configured for use in NED devices include reflective surfaces configured to propagate light rays through total internal reflection (TIR). One aspect of translating a pupil from one position to another via a waveguide involves receiving the light rays into the waveguide ("in-coupling") at a first location and outputting the light rays from the waveguide ("out-coupling") at a second location.

Light rays can in-coupled to and out-coupled from a waveguide via a DOE that functions as an input port or an output port for the light rays. A DOE can include a diffraction grating structure, for example a surface relief diffraction grating (SRG). However, the diffraction efficiency of a conventional grating-based DOE is highly sensitive to both the wavelength and angle of incidence of the diffracted light rays. This results in waveguide displays that are only able to effectively in-couple and out-couple a narrow field of view (FOV) (e.g., less than 30 degrees) of a generated image. This high sensitivity to wavelength and angle of incidence restricts the use of such components when large FOVs (e.g., over 30 degrees) are considered, or when the range of wavelength of light is relatively broad (e.g., full color displays). If a large FOV is desired, the diffraction efficiency of the grating should be sufficiently high over the whole FOV to avoid greatly compromising the uniformity of the image across the FOV.

Tests have demonstrated that the diffraction efficiency of a grating-based DOE at a given wavelength or angle of incidence of light can depend on the refractive index of the material used to form the grating structure. In some configurations, increasing the refractive index of the material used to form the diffraction grating structure increases and provides for a more uniform diffraction efficiency over a range of angles of incidence and wavelength of light rays. Glass materials with sufficiently high refractive indices (e.g., n=1.9) can be used to form the substrate of a waveguide. However, using glass to form diffraction grating structures typically involves a process of etching the structure into the glass. This process is expensive, time consuming and generally impractical, particularly for mass produced waveguide displays for consumer NED devices.

A cheaper and quicker process for forming the grating structure of a DOE involves using standard UV-curable resin, however standard UV-curable resins are polymer-based and typically have a lower refractive index (e.g., n=1.5-1.7) than glass. A waveguide display with a glass substrate and grating structures made of polymer-based resin will, as a result, be limited to displaying a relatively narrow FOV.

Accordingly, introduced here are solutions to this problem, which include coating and/or burying a grating structure made of a material with a first refractive index material in another with a second refractive index that is not equal to the first refractive index. It has been found that increasing the contrast between the refractive index of the grating structure and the refractive index of the coating can increase the diffraction efficiency of a grating-based DOE over a range of wavelengths and angles of incidence of diffracted light rays.

FIG. 1 shows an example of a near-eye display (NED) device in which the technique introduced here can be incorporated. The NED device 140 may provide virtual reality (VR) and/or augmented reality (AR) display modes for a user, i.e., the wearer of the device. To facilitate description, it is henceforth assumed that the NED device 140 is designed for AR visualization.

In the illustrated embodiment, the NED device 140 includes a chassis 141, a transparent protective visor 142 mounted to the chassis 141, and left and right side arms 144 mounted to the chassis 141. The visor 142 forms a protective enclosure for various display elements (not shown) that are discussed below.

The chassis 141 is the mounting structure for the visor 142 and side arms 144, as well as for various sensors and other components (not shown) that are not germane to this description. A display assembly (not shown in FIG. 1) that can generate images for AR visualization is also mounted to the chassis 141 and enclosed within the protective visor 142. The visor assembly 142 and/or chassis 141 may also house electronics (not shown) to control the functionality of the display assembly and other functions of the NED device 40. The NED device 140 shown in FIG. 1 is a head-mounted display HMD device and so further includes an adjustable headband 145 attached to the chassis 141, by which the NED device 140 can be worn on a user's head.

Figure 2A:
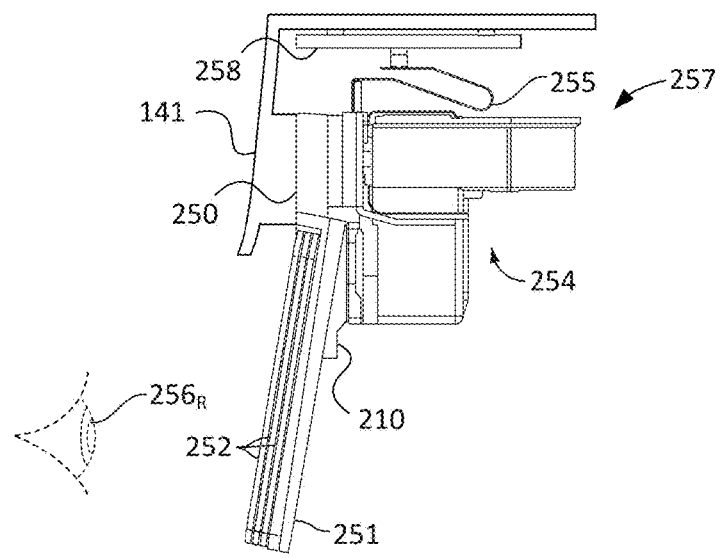
FIG. 2A shows a right side view of display components that may be contained within the NED device of FIG. 1.
Figure 2B:
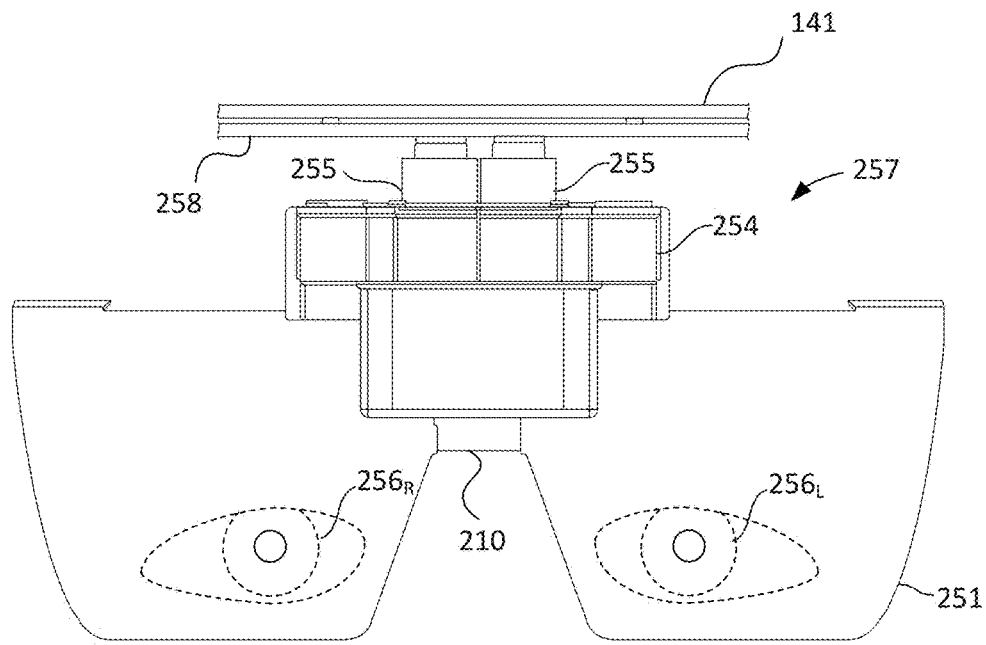
FIG. 2B shows a front view of display components that may be contained within the NED device of FIG. 1.

FIGS. 2A and 2B show, in accordance with certain embodiments, right side and front orthogonal views, respectively, of display components that may be contained within the visor 142 of the NED device 140. During operation of the NED device 140, the display components are positioned relative to the user's left eye $256_L$ and right eye $256_R$ as shown. The display components are mounted to an interior surface of the chassis 141. The chassis 141 is shown in cross-section in FIG. 2A.

The display components are designed to overlay three-dimensional images on the user's view of his real-world environment, e.g., by projecting light into the user's eyes. Accordingly, the display components include a display module 254 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 254 may be connected via a flexible circuit connector 255 to a printed circuit board 258 that has image generation/control electronics (not shown) mounted on it.

The display components further include a transparent waveguide carrier 251 to which the display module 254 is mounted, and one or more transparent waveguides 252 stacked on the user's side of the waveguide carrier 251, for each of the left eye and right eye of the user. The waveguide carrier 251 has a central nose bridge portion 210, from which its left and right waveguide mounting surfaces extend. One or more waveguides 252 are stacked on each of the left and right waveguide mounting surfaces of the waveguide carrier 251, to project light emitted from the display module and representing images into the left eye $256_L$ and right eye $256_R$, respectively, of the user. The display assembly 257 can be mounted to the chassis 141 through a center tab 250 located at the top of the waveguide carrier 251 over the central nose bridge section 210.

Figure 3A:
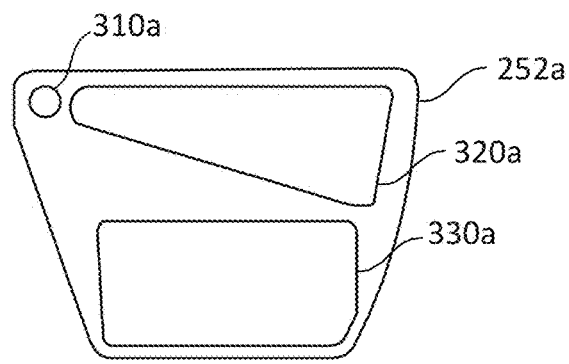
FIG. 3A shows an example waveguide with a single input and single output configured to convey light to an eye of a user of the NED device of FIG. 1.

FIG. 3A shows a single input pupil design for a waveguide 252a that can be mounted on the waveguide carrier 251 to convey light to a particular eye of the user, in this example, the right eye of user. A similar waveguide can be designed for the left eye, for example, as a (horizontal) mirror image of the waveguide shown in FIG. 3A. The waveguide 252a is transparent and, as can be seen from FIGS. 2A and 2B, would normally be disposed directly in front of the right eye of the user during operation of the NED device, e.g., as one of the waveguides 252 in FIG. 2A. The waveguide 252a is, therefore, shown from the user's perspective during operation of the NED device 140.

The waveguide 252a includes a single input port 310a (also called an in-coupling element, and corresponding to the single input pupil) located in the region of the waveguide 252a that is closest to the user's nose bridge when the NED device 140 is worn by the user. In certain embodiments, the input port 310a is or includes a DOE which can include, for example a surface diffraction grating, volume diffraction grating, and/or a Switchable Bragg Grating (SBG). The waveguide 252a further includes an output port 330a (also called out-coupling element) and a transmission channel 320a. As with the input port 310a, in certain embodiments, the output port 330a is or includes a DOE which can include, for example a surface diffraction grating, volume diffraction grating, and/or an SBG. A right-eye output port of the display module (not shown) is optically coupled (but not necessarily physically coupled) to the input port 310a of the waveguide 310. During operation, the display module 252 (not shown in FIG. 3) outputs light representing an image for the right eye from its right-eye output port (not shown) into the input port 310a of the waveguide 252a.

The transmission channel 320a conveys light from the input port 311 to the output port 313 and may include, for example, a surface diffraction grating, volume diffraction grating, or a reflective component such as a substrate with multiple internally reflective surfaces. The transmission channel 320a may be designed to accomplish this by use of total internal reflection (TIR). Light representing the image for the right eye is then projected from the output port 330a to the user's eye.

Figure 3B:
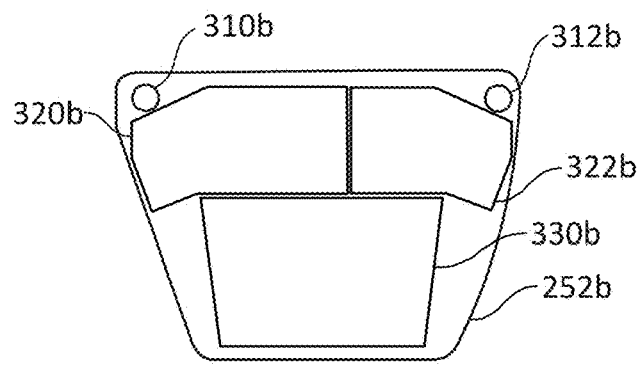
FIG. 3B shows an example waveguide with multiple inputs and single output configured to convey light to an eye of a user of the NED device of FIG. 1.

As shown in FIG. 3B, in some embodiments a waveguide may include multiple input ports 310b and 312b, for example to provide a greater overall FOV through multiplexing different FOVs of the projected image. Note that while the present disclosure describes waveguides with one or two input ports/pupils and a single output port/pupil, a display device incorporating the technique introduced here may have a waveguide with more than two input ports/pupils and/or more than one output port/pupil for a given eye. Further, while the example of FIG. 3B is for the right eye, a similar waveguide can be designed for the left eye, for example, as a (horizontal) mirror image of the waveguide in FIG. 3B.

As shown in FIG. 3B, the waveguide 252b includes two separate input ports 310b and 312b, two transmission channels 320b and 322b, and an output port 330b. During operation, each of the input ports 310b, 312b receives light (from the display module 254) representing a different portion of the image for the right eye of the user. Each of the transmission channels 320b, 322b is optically coupled to a separate one of the input ports 310b or 312b and conveys light from only the corresponding input port 310b or 312b to the output port 330b. Each of the transmission channels 320b, 322b may be, for example, an internal or surface diffraction grating design to channel light by TIR. Light from the two different portions of the image is combined at the output port 330b and projected into the eye of the user as a single integrated image.

In some embodiments, the left input port 310b receives the left portion (e.g., half) of the image for one eye of the user (e.g., the right eye) while the right input port 312b receives the right portion (e.g., half) of the image for that same eye. Each portion of the image can include all of the color components that are present in the complete image, e.g., red, green and blue color components. The portions of the image may be generated in a tiled manner, i.e., where they are spatially contiguous and non-overlapping, or they may at least partially overlap spatially. Further, in other embodiments, rather than generating left and right portions of the image, the separate portions of the image could be upper and lower portions of the image, or the image could be spatially divided in some other manner. Additionally, the waveguide 252b could have more than two input ports, in which case the image could be provided to the waveguide 252b in the form of three or more separate image portions, which are reintegrated in the waveguide 252b.

Hence, in at least some embodiments, different portions of an image for a given eye of the user are generated and input simultaneously into separate input ports of a waveguide, then reintegrated within the waveguide and projected into the eye of the user as a single integrated image, to produce a larger FOV. In other embodiments, the separate portions of the image could be input to the waveguide in a time division multiplexed manner, rather than simultaneously. Further, in some embodiments, the physical placement of the input ports on the waveguide may be different from that shown in FIG. 3B. For example, the input ports could be spaced apart vertically on the waveguide rather than, or in addition to, horizontally. Other input port configurations are also possible.

Figure 3C:
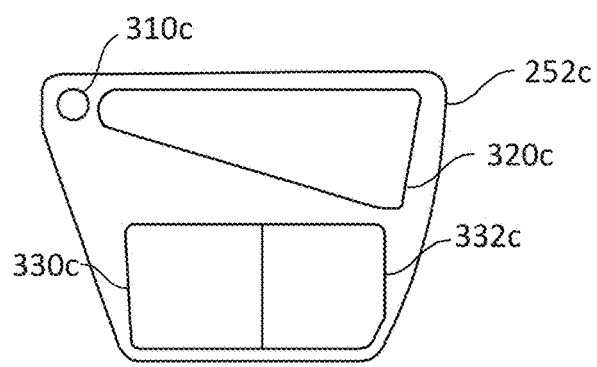
FIG. 3C shows an example waveguide with a single input and multiple outputs configured to convey light to an eye of a user of the NED device of FIG. 1.

As shown in FIG. 3C, in some embodiments a waveguide may include multiple output ports 330c and 332c, for example to provide a greater overall field of view (FOV) through multiplexing different fields of view of the projected image. Note that while the present disclosure describes a waveguides with two output ports/pupils and a single input port/pupil, a display device incorporating the technique introduced here may have a waveguide with more than two input ports/pupils and/or more than two output ports/pupils for a given eye. Further, while the example of FIG. 3C is for the right eye, a similar waveguide can be designed for the left eye, for example, as a (horizontal) mirror image of the waveguide in FIG. 3C.

As shown in FIG. 3C, the waveguide 252c includes two separate output ports 330c and 332c, a transmission channel 320c, and an input port 310c. During operation, the input ports 310c receives light (from the display module 254) representing a different portion of the image for the right eye of the user. The transmission channel 320c is optically coupled to the input ports 310c and conveys light from the input port 310c or the output ports 330c and 332c. The transmission channels 320c may be, for example, an internal or surface diffraction grating design to channel light by TIR. Each of the two output ports 330c and 332c output light corresponding to one of two different portions of an image and project the respective protons of the image into the eye of the user as a single integrated image.

In some embodiments, the left output port 330c projects the left portion (e.g., half) of the image for one eye of the user (e.g., the right eye) while the right output port 332c projects the right portion (e.g., half) of the image for that same eye. Each portion of the image can include all of the color components that are present in the complete image, e.g., red, green and blue color components. The portions of the image may be generated in a tiled manner, i.e., where they are spatially contiguous and non-overlapping, or they may at least partially overlap spatially. Further, in other embodiments, rather than generating left and right portions of the image, the separate portions of the image could be upper and lower portions of the image, or the image could be spatially divided in some other manner. Additionally, the waveguide 252c could have more than two output ports, in which case the image can be projected to the eye of the user in the form of three or more separate image portions Hence, in at least some embodiments, different portions of an image for a given eye of the user are generated and input simultaneously into separate input ports of a waveguide, then reintegrated within the waveguide and projected into the eye of the user as a single integrated image, to produce a larger FOV. In other embodiments, the separate portions of the image could be input to the waveguide in a time division multiplexed manner, rather than simultaneously. Further, in some embodiments, the physical placement of the input ports on the waveguide may be different from that shown in FIG. 3C. For example, the input ports could be spaced apart vertically on the waveguide rather than, or in addition to, horizontally. Alternatively, in some embodiments, the multiple output ports of a waveguide may be overlaid over one another instead of oriented side by side as shown in FIG. 3C. Other input port configurations are also possible.

Figure 4:
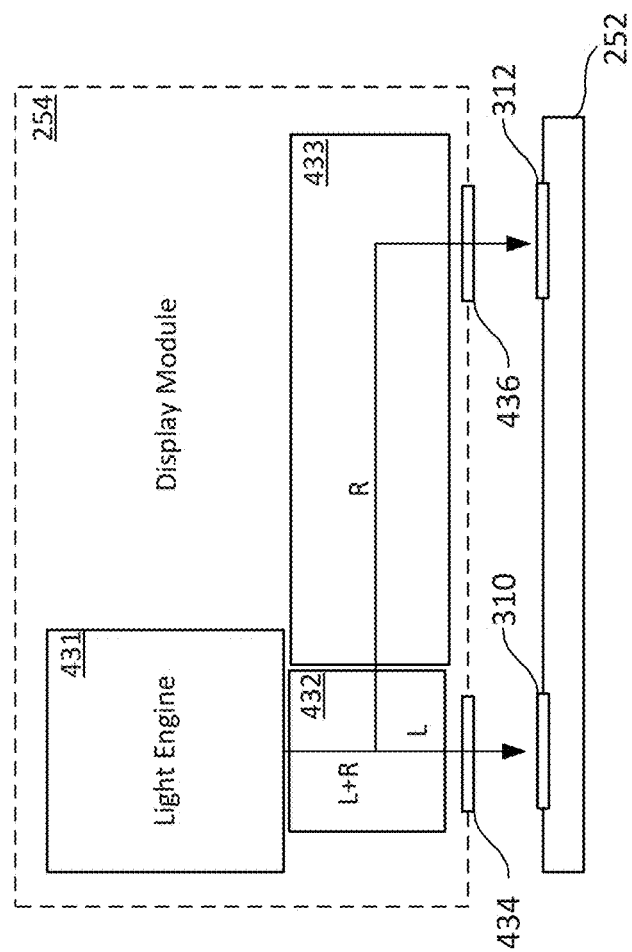
FIG. 4 is a schematic diagram that shows the components of an example display module that may be contained within the NED device of FIG. 1.

FIG. 4 schematically shows an example display module 254 configured for use with a NED device such as NED device 140 in FIGS. 2A-2B. Note, that example display module 254 shown in FIG. 4 is configured for use with a dual input port waveguide as shown at example waveguide 252b in FIG. 3B. However, similar principles can be applied for a display module configured for use with fewer or more input ports, for example as shown at example waveguides 252a and 252c in FIGS. 3A and 3C (respectively).

As shown in FIG. 4, example display module 254 includes a light engine 431, an optical switch 432 and a pupil relay 433. Though not shown, the display module 254 may also include similar or identical components for the other eye of the user. In some embodiments, the light engine 431 includes one or more light sources (not shown), such as one or more colored LEDs. For example, the light engine 431 can include red, green and blue LEDs to produce the red, green and blue color components, respectively, of the image. Additionally, the light engine 431 includes at least one microdisplay imager (not shown), such as an LCOS imager, LCD or DMD; and may further include one or more lenses, beam splitters, waveguides, and/or other optical components (not shown).

The optical switch 432 controls the propagation direction of the light output by the light engine 431, representing each particular portion of the image, to one of two different optical paths. In the illustrated embodiment, the first path is for the left half of the image and leads to an output port 434 of the display module 254 that is coupled to one corresponding input port 310 of the waveguide 252. The other optical path is for the right portion of the image and includes a pupil relay 433, which propagates that portion of the image to a second output port 436 of the display module 54, which is optically coupled to a second corresponding input port 312 of the waveguide 252.

The optical switch 432 selectively controls the propagation direction of light from the light engine 431 based on a switching criterion, such as polarization. For example, one half of the image may have s-polarization while the other half of image has p-polarization, where the optical switch 432 conveys s-polarized light along one optical path and conveys p-polarized light along the other optical path. The switch 432 can be, for example, an LCD mirror that either transmits light or acts as a perfect mirror, depending on the applied voltage. Note, however, that a switching criterion (or criteria) other than polarization could be used. For example, time division multiplexing could be used to switch between the optical paths. The optical switch 432, therefore, enables a single light engine 431 to provide two pupils for an image to two separate in-coupling elements 310, 312 on a waveguide 252. In an example waveguide with only one input port, optical switch 432 may direct light emitted from light engine 431 to the single input port.

The pupil relay 433 is optional but enables larger distances between the input ports 310, 312 on the waveguide 252. The pupil relay 433 may be constructed using any known or convenient method and materials for transferring an image pupil from one location to another. For example, the pupil relay 433 may be constructed from a sequence of paraxial lenses that focus the pupil to an intermediate image and then collimate it, followed by a mirror to redirect the light into the corresponding input port of the waveguide.

Figure 5:
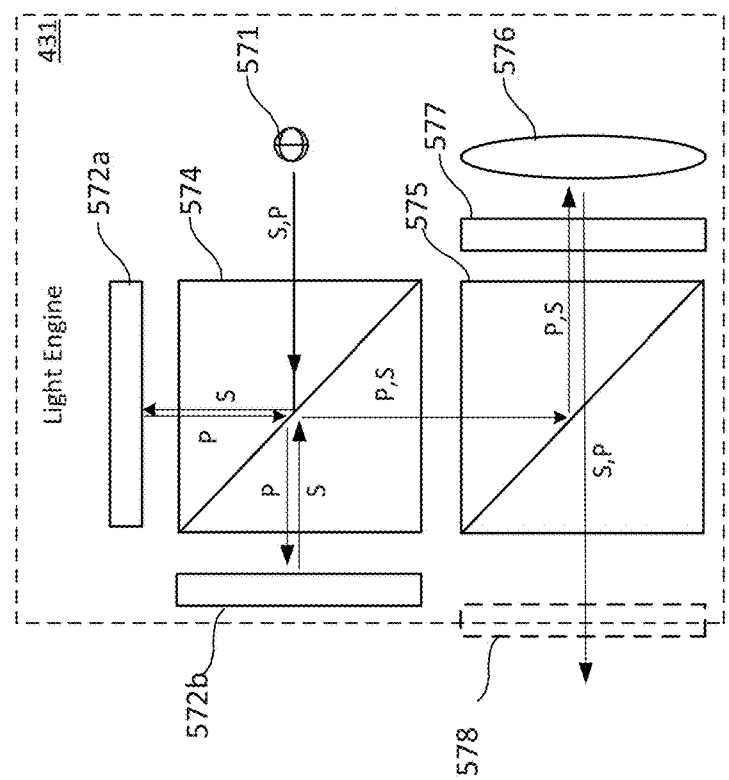
FIG. 5 is a schematic diagram that shows the components of an example light engine configured for use with the display module of FIG. 4.

FIG. 5 schematically illustrates an example light engine 431 including certain relevant components. The view in FIG. 5 is from the right side of the display module 254. Note that some embodiments may include other active and/or passive components, not shown. The light engine 431 in the illustrated embodiment includes at least one light source 571, such as a color LED. Although only one light source 571 is shown in FIG. 5, in practice there may be multiple light sources provided for each eye of the user, e.g., one for each color component of whatever color model is being employed (e.g., red, green and blue). The same or a similar configuration as shown in FIG. 5 can be used to combine light from such multiple light sources.

The light engine 431 further includes one or more imagers (e.g., LCOS microdisplays) 572a and 572b that generate an image intended for display to a particular eye of the user. Note that the example light engine 431 shown in FIG. 5 includes two imagers 572a and 572b, however another light engine may include one or more than two imagers. In the case of multiple imagers 572a and 572b, each imager may generate a portion of the image to be displayed to the user. A retarder (e.g., quarter-wave plate) can be placed before the waveguide at one of the waveguide inputs to have optimum polarization entering the waveguide.

Additionally, the light engine 431 can include a combination of polarizing beam splitters (PBSs) 574, 575, one or more reflective lenses 576 and one or more quarter-wave plates 577, that generate and propagate the image(s) through the output port 578 of the light engine 431. In the example shown in FIG. 5, a first PBS 574 reflects s-polarized light from the light source 571 upward to a first microdisplay imager 572a, which generates one portion of the image. The PBS 574 also causes p-polarized light from the light source 571 to be propagated straight through to the other microdisplay imager 572b, which produces a second portion of the image. Both portions of the image (separately constituting s-polarized and p-polarized light) then propagate downward through the PBS 574 to a second PBS 575, which directs them to birdbath-shaped reflective lenses 76 via quarter-wave plates (retarders) 577. The image portions are then reflected back by the reflective lenses 576 through the quarter-wave plates 577 and then through the PBS 75. From there, the image portions are output through the output port 578 of the light engine 431 and provided to additional optics in the display module 254, as shown by the example in FIG. 4.

Figure 6:
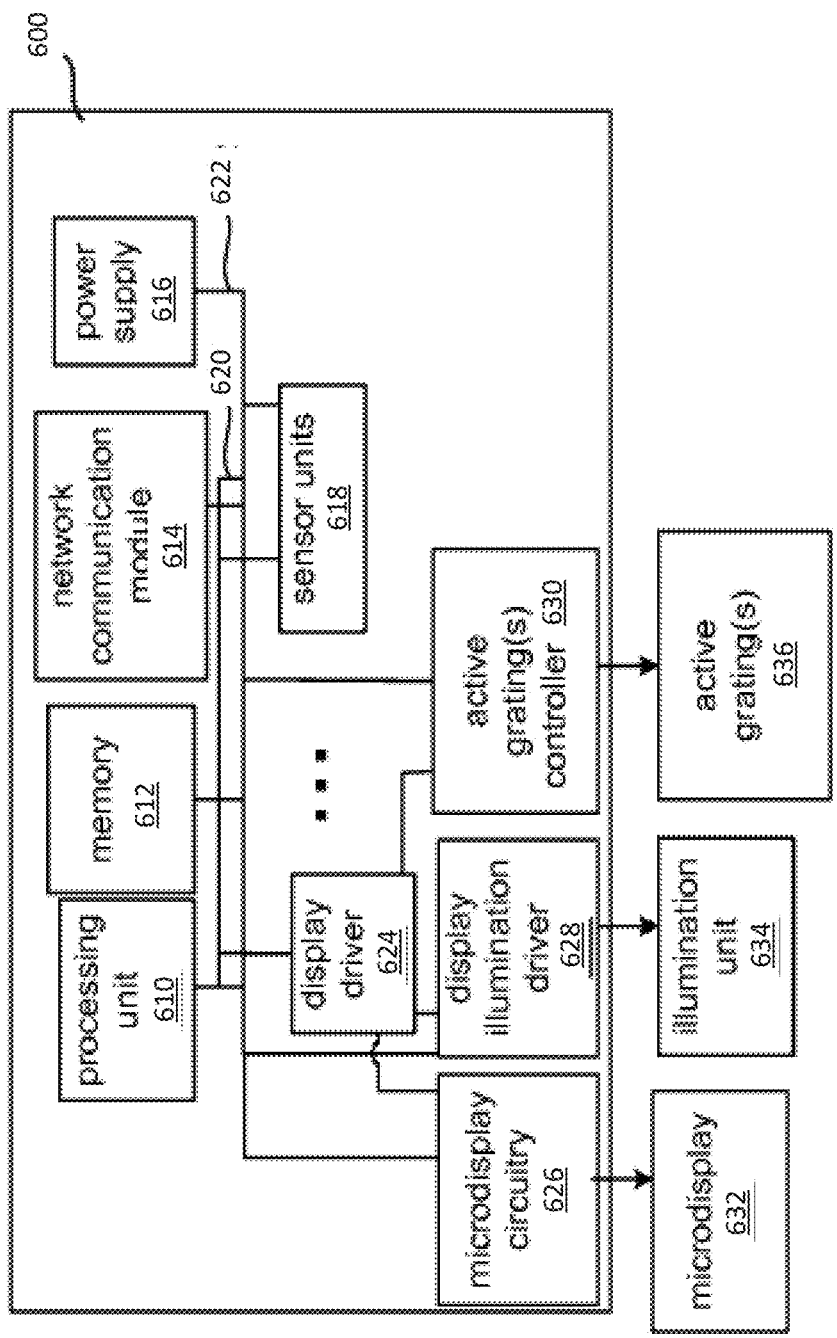
FIG. 6 is a block diagram of example hardware components including a computer system within control circuitry of the NED device of FIG. 1.

FIG. 6 is a block diagram of example hardware components including a computer system within control circuitry 600 of a NED device 140. Control circuitry 600 provides various electronics that support the other components of NED device 140. In this example, the control circuitry 600 for includes a processing unit 610, a memory 612 accessible to the processing unit 610 for storing processor readable instructions and data, a communication module 614 communicatively coupled to the processing unit 610 which can act as a network interface for connecting the NED device to another computer system. A power supply 616 provides power for the components of the control circuitry 600 and the other components of the NED device 140 like sensor units 618 which may include, but are not limited to, image capture devices (e.g. cameras), audio capture devices (e.g. microphones), and location/motion capture devices (e.g. accelerometers).

The processing unit 610 may include one or more processors including a central processing unit (CPU) and/or a graphics processing unit (GPU). Memory 612 is representative of the various types of memory which may be used by the system such as random access memory (RAM) for application use during execution, buffers for sensor data including captured image data and display data, read only memory (ROM) or Flash for instructions and system data, and other types of nonvolatile memory for storing other items, some examples of which are applications for which image light representing image data is generated. In this example, an electrical connection of a data bus 620 connects the sensor units 618, a display driver 624, processing unit 610, memory 612, and the communication module 614. The data bus 620 also derives power from the power supply 616 through a power bus 622 to which all the illustrated elements of the control circuitry are connected for drawing power.

The control circuitry 600 further includes the display driver 624 for selecting digital control data, e.g. control bits, to represent image data which digital control data may be decoded by microdisplay circuitry 626 and different active component drivers. An example of an active component driver is a display illumination driver 628 which converts digital control data to analog signals for driving an illumination unit 634 which includes one or more light sources (e.g. similar to light source 571 in FIG. 5) like one or more light emitting diodes (LEDs). A microdisplay 632 may be an active transmissive, emissive, or reflective device. For example, microdisplay 632 may be similar to the one or more imagers 572a-b described with reference to FIG. 5. Microdisplay 632 may be a liquid crystal on silicon (LCoS) device requiring power or a micromechanical machine (MEMs) based device requiring power to move individual mirrors. In some embodiments, a waveguide display may include one or more active gratings 636 such as a Switchable Bragg Grating (SBG). An active grating(s) controller 630 converts digital control data into signals for changing the properties of one or more active gratings 636.

In some embodiments discussed below, the control circuitry 600 may include other control units not illustrated here but related to other functions of a NED device 140 device such as, for example, polarization control, providing audio output, identifying head orientation and location information. In other embodiments, some of the processing and memory resources identified in FIG. 6 can be shared between the control circuitry 600 and a companion processing module embodied in, for example, a mobile device (e.g. a smart phone) communicatively coupled to the NED device 140.

FIGS. 7A and 7B illustrate the propagation of light rays in a pupil relay using diffractive optical elements DOEs on a waveguide substrate. The term "pupil relay" describes the system of components used to spatially transfer a pupil from on location to another, for example from entry pupil 710a-b to exit pupil 712a-b. In some embodiments, the pupil relay includes a waveguide with optical properties such that the entry pupil and exit pupil of the waveguide have substantially identical size and shape, and such that polychromatic light rays input to the pupil relay propagate collinearly through the pupil relay by total internal reflection (TIR), so that the corresponding output light rays have substantially identical chromatic properties to those of the input light rays; that is, the pupil relay is achromatic. In this context, "substantially identical" means that there is no perceivable difference in these properties to a human user. In other embodiments, the optical properties of the entry pupil may differ from the optical properties of the exit pupil, for example, for pupil expansion.

As shown in FIG. 7A, in some embodiments, a pupil relay is a waveguide 700a that includes a light-transmissive substrate 750a with at least two surfaces 752a and 754a that are substantially parallel to each other and that are internally reflective so as to provide TIR of light rays propagating within the substrate 133. Waveguide 700a also includes two DOEs 760a and 762a that facilitate light entry and exit from the substrate (one on the input end and one on the output end). In some embodiments, DOEs 760a and 762a are surface relief diffraction gratings formed as part of or proximate to a given surface (i.e., a surface parallel to the direction of propagation of the light rays within the substrate) of the substrate 750a of the waveguide 700a. For example, as shown in FIG. 7A, DOEs 760a and 762a may be formed on or proximate to surface 752a of substrate 750a. In this description, "proximate to" means no deeper than one micrometer from the surface. It may be desirable to make the depth of each DOE relatively large compared to its period.

The DOEs 760a and 762a are designed to cause light rays of different colors to propagate collinearly through the substrate 752a and to continue to propagate collinearly upon exiting the waveguide 700a, respectively. For example, FIG. 7A shows collinear light rays 714a and 716a of two different colors entering substrate 750a via DOE 760a (the in-coupling element), propagating through substrate 750a through TIR, and exiting substrate 750a at DOE 762a (the out-coupling element).

FIG. 7B shows another way of combining multiple colors into a single waveguide by using DOEs. In FIG. 7B, the waveguide 700b includes at least four diffraction DOEs 760b, 762b, 764b, and 766b formed in or proximate to two opposite surfaces 752b and 754b of the substrate 750b that are parallel to the direction of propagation of the light rays within the substrate. The DOEs 760b and 762b on one surface 752b (e.g., top surface) of the waveguide 700b couple a first color (represented by light ray 714b), and the DOEs 764b and 766b on the opposite surface 754b (e.g., bottom surface) of the substrate 750b couple a second color (represented by light ray 716b). This can be done using, for example, DOEs that work only on one polarization (colors have orthogonal polarizations) or using switchable diffraction gratings to enable selection of the coupled color for each diffraction gating. As mentioned above, the same principle can be applied to allow collinear propagation of three or more colors through the pupil relay in the embodiments of FIGS. 7A and 7B.

In the embodiments of FIGS. 7A and 7B, the substrates 750a-b are formed of material(s) with appropriate optical properties to facilitate light propagation through TIR. In some embodiments, substrates 750a-b are made of glass, for example, formed through an injection molding process. As mentioned, each of the DOEs 760a-b, 762a-b, 764b, and 766b may include surface relief diffraction gratings (SRG) can be part of a surface of the substrate 750a-b (e.g. formed through etching into a surface of substrate 750a-b or formed during an injection molding process), can be formed on a surface of substrate 750a-b (e.g. through application and curing of material on the surface), or can be buried within the substrate 750a-b. Hence, the light input surface and light output surface of the waveguide 700a-b, respectively, are each a DOE, or a portion of the substrate surface directly over a DOE if the DOE is buried below the surface. It can be assumed that each DOE in the pupil relay is substantially coplanar with at least one of the surfaces of the substrate that are parallel to the long axis of the pupil relay (i.e., each DOE is parallel to such surface and within one micrometer of depth of such surface).

FIGS. 8A and 8B show cross-sectional views of example waveguides 800a-b at interface that include a substrate 850a-b (respectively) and DOEs 860a-b (respectively) that include a surface relief grating (SRG) structure. Waveguides 800a-b can be considered analogous to waveguides 700a-b described with respect to FIGS. 7A and 7B. Similarly, substrates 850a-b can be considered analogous to substrates 750a-b and DOEs 860a-b can be considered analogous to any of DOEs 760a-b, 762a-b, 764b, and 766b as described with respect to FIGS. 7A and 7B.

FIGS. 8A and 8B illustrate alternative methods for forming the grating structure of a DOE. For example FIG. 8A shows an example waveguide 800a formed of a single material, such as glass. As previously explained glass has sufficient reflective properties to facilitate light propagation along the substrate 850a through TIR and has a sufficiently high refractive index (~1.7-1.9) to facilitate a high diffraction efficiency for in-coupling/out-coupling of light via the DOE 860a. In some embodiments substrate 850a and DOE 860a are formed as a single element out of glass through an injection molding process. More likely, however, substrate 850a is formed out of glass through injection molding and the SRG structure of DOE 860a is formed by a precise etching process into the surface of substrate 850a.

As previously mentioned, a waveguide made of a single high index material such as waveguide 800a has performance advantages, but is impractical to manufacture particularly in the context of mass produced consumer-level NED devices. Waveguide 800b in FIG. 8B is an alternative embodiment in which DOE 860b is formed on at least one surface of substrate 850b through a replication process. As with waveguide 800a, the substrate 850b of waveguide 800b is formed of a material with appropriate optical properties to facilitate light propagation through TIR, for example glass. Substrate 850b can be manufactured out of glass using any standard manufacturing process. The SRG of DOE 860b is then formed on a surface of substrate 850b. In some embodiments, the SRG of DOE 860b is formed through a curing process of standard UV-curable polymer-based resin. While much cheaper and quicker than forming the grating structure out of a material such as glass, standard UV-curable resin has a relatively low refractive index (e.g. ~1.5-1.7). This results in relatively low diffraction efficiency at certain wavelengths and angles of incidence of light rays, thereby resulting in limited FOV for displayed images.

Figure 9:
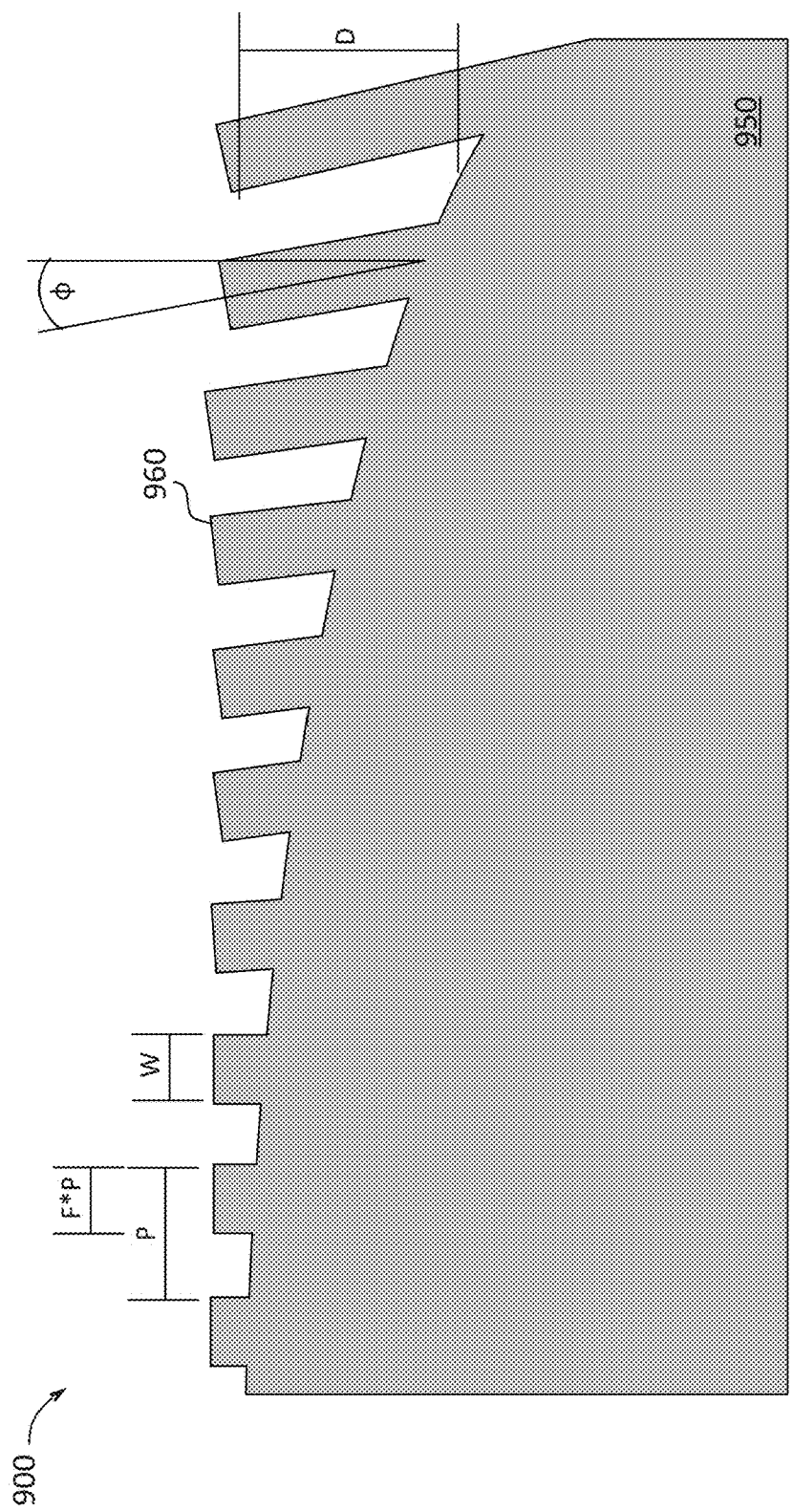
FIG. 9 shows a cross-sectional view an example DOE that includes a diffraction grating that varies across an area of the DOE.

Note that that substrates 850a-b and DOEs 860a-b are illustrated conceptually in FIGS. 8A and 8B and are not intended to show limiting structural configurations or true dimensions. For example the dimensions of the diffraction grating structures of DOEs 860a-b are greatly exaggerated relative to the dimensions of substrate 850a-b for clarity purposes. Similarly, the number, shape, and orientation of diffraction grating structures of DOEs 860a-b are intended to be illustrative and not limiting. In some embodiments, the diffraction grating structures may vary in one or more parameters across the area of the DOE. FIG. 9 shows a cross-sectional view of another example waveguide 900 including a DOE 960 and a substrate 950. The cross section of example waveguide 900 shown in FIG. 9 shows that the grating structure of DOE 960 can vary across an area of the DOE 960 in one or more parameters, such as grating period P, grating line width W, grating fill factor F, grating depth D, slant angle (1), line shape, surface pattern (not shown) and modulation direction. The grating fill factor F is the fraction of the grating period that is filled with grating material. In other words, fill factor F=W/P.

Again, the structural elements of waveguide 900 are illustrated conceptually and not intended to show limiting structural configurations or dimensions. Configuration of the diffraction grating structure (i.e. setting the aforementioned parameters) to achieve a desired in-coupling or out-coupling effect is well understood in the art.

Figure 10:
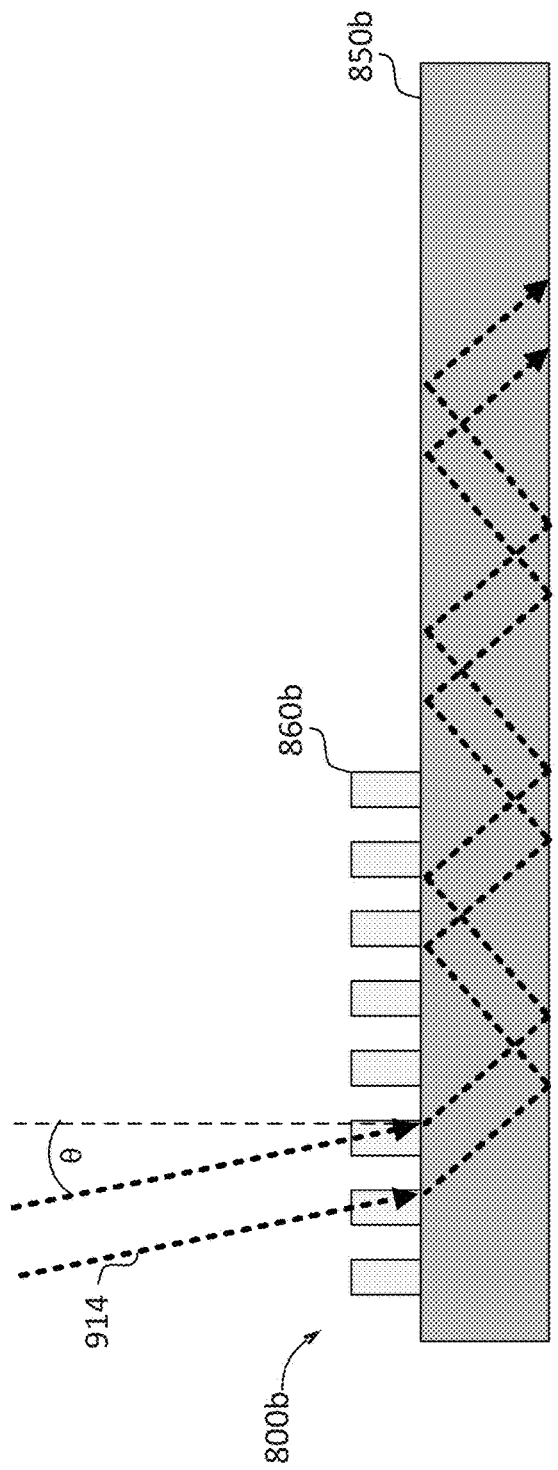
FIG. 10 shows the in-coupling of light rays into a substrate via an example DOE that does not include a coating.

FIG. 10 shows the in-coupling of light rays 914 into substrate 850b via a DOE 860b of waveguide 800b. As shown in FIG. 10, light rays 914 are diffracted and refracted at DOE 860b and propagate along substrate 850b through TIR. As previously mentioned with respect to FIG. 8B, the substrate 850b of waveguide 800b can be made of a high index material such as glass and the diffraction grating structure of DOE 860b can be made of a low index (relative to the substrate) material such as UV-curable polymer-based resin. The out-coupling of light rays 914 from the substrate 850b via a second DOE would follow the same principles as illustrated in FIG. 10.

Figure 11:
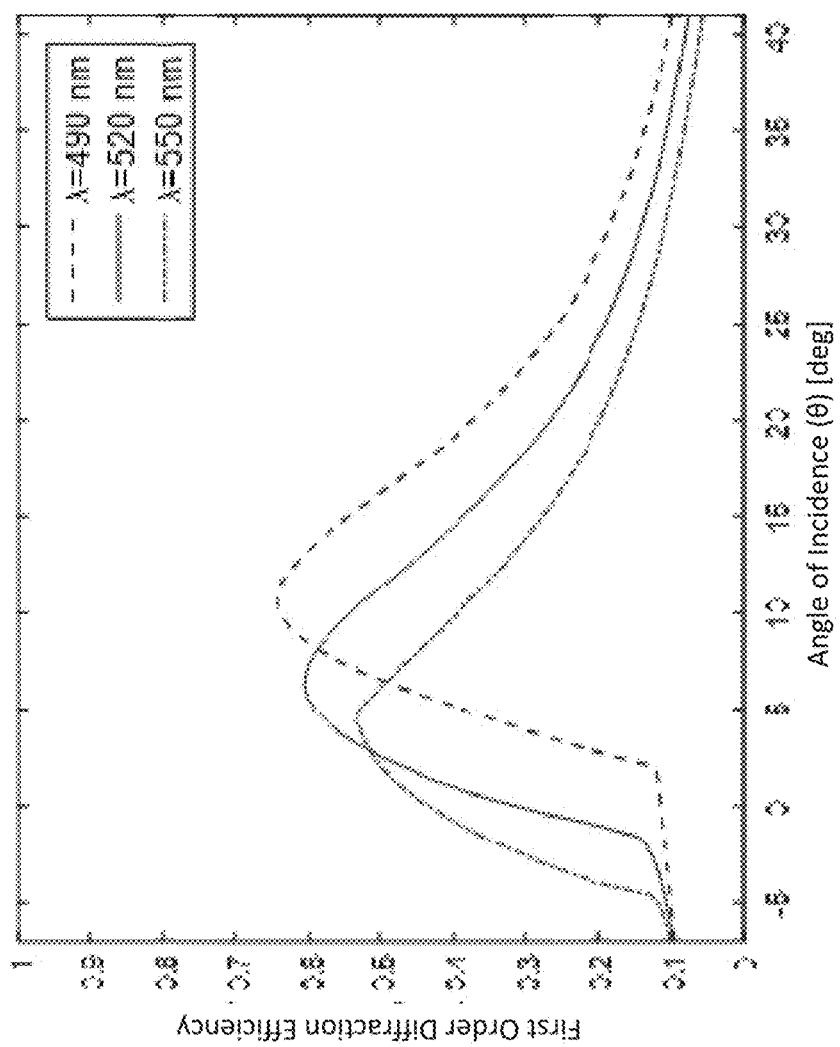
FIG. 11 is a graph that charts first-order diffraction efficiency of an in-coupler DOE with a diffraction grating with no coating over a range of angles of incidence for various wavelengths of light.

FIG. 11 is a graph that charts first-order diffraction efficiency of an in-coupler DOE with a diffraction grating formed of low index material (or that does not include an applied coating) over a range of angles of incidence θ for various wavelengths A of light. The example in-coupler (e.g. similar to in-coupler DOE 860b of waveguide 800b) is optimized for a maximal in-coupling diffraction efficiency over the FOV for light in the 520±30 nm wavelength range. As show in FIG. 11 the minimum efficiency over the FOV drops well below 10%, and at certain angles the wavelength sensitivity is very high (10% vs. 50% for instance). In practical terms, FIG. 11 demonstrates that a diffraction grating structure with a relatively low refractive index will result in poor image uniformity across the 48° field of view. For example, a user may experience a rainbow effect or other image artifacts at the peripheral edge of the a displayed FOV.

Figure 12A:
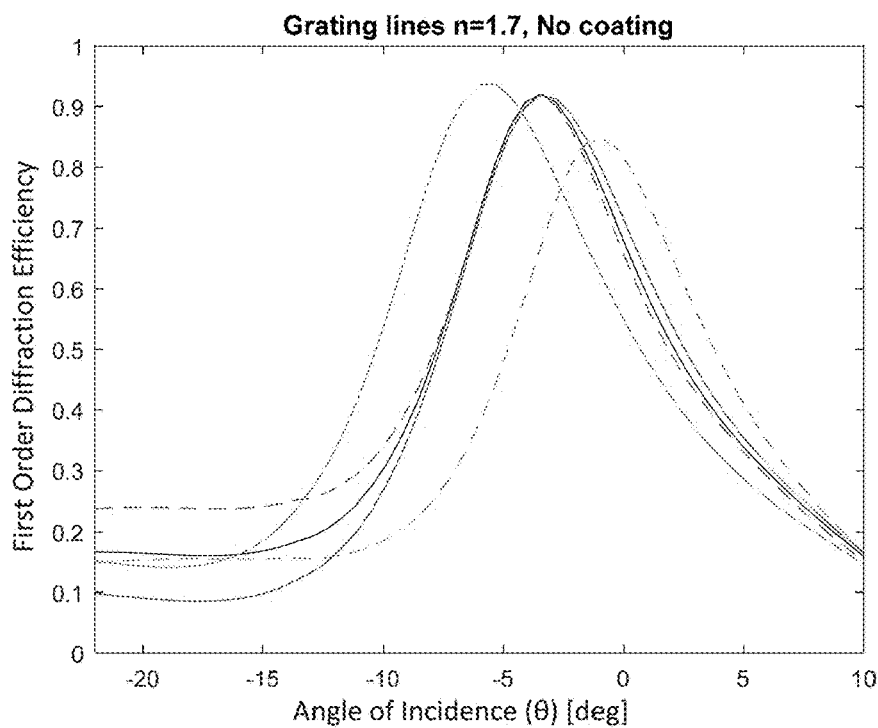
FIG. 12A is a graph that charts first-order diffraction efficiency over a range of angles of incidence for an in-coupler DOE formed on a substrate with a refractive index of 1.7, the DOE including a diffraction grating with a refractive index of 1.7.
Figure 12B:
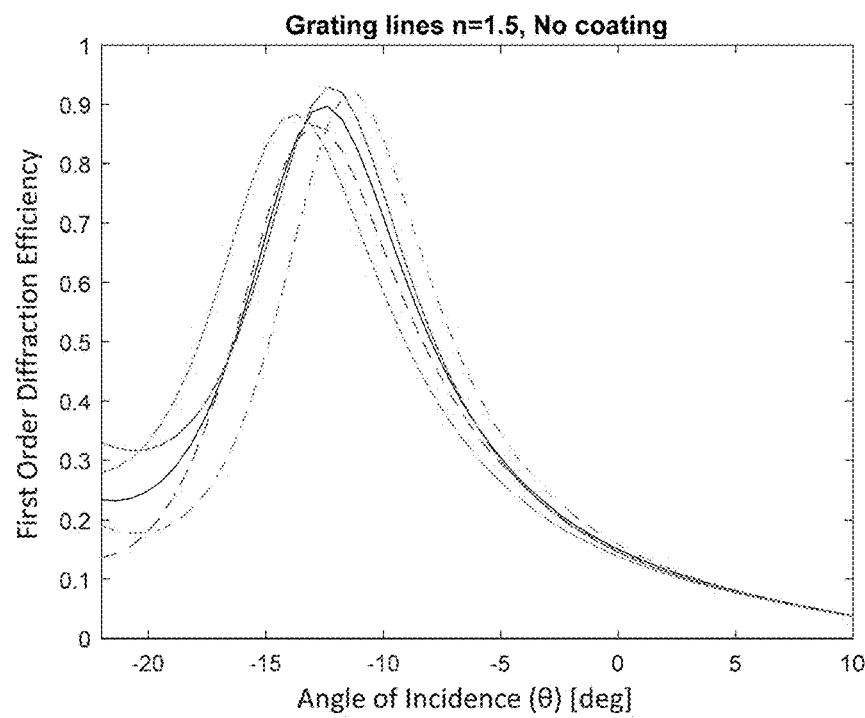
FIG. 12B is a graph that charts first-order diffraction efficiency over a range of angles of incidence for an in-coupler DOE formed on a substrate with a refractive index of 1.7, the DOE including a diffraction grating with a refractive index of 1.5.

FIGS. 12A and 12B are graphs that chart first-order diffraction efficiency over a range of angles of incidence θ for two different in-coupler DOEs with diffraction grating structures formed of materials with different refractive indices (1.7 and 1.5, respectively). In the cases of both FIGS. 12A and 12B, the waveguide includes a substrate made of glass with a refractive index of 1.7 and a grating structure optimized for maximal in-coupling over a FOV for monochromatic green light at ~525 nm wavelength. The diffraction gratings have a period P of 358 nm and are otherwise constrained in other structural parameters as follows: D<450 nm, 0.3<F<0.7, −45°<Φ<+45°. As shown in FIGS. 12A and 12B, changing the refractive index of the diffraction grating material from 1.5 to 1.7 changes the angle of incidence at which diffraction efficiency is maximized, but still results in high variation across a FOV.

Figure 13A:
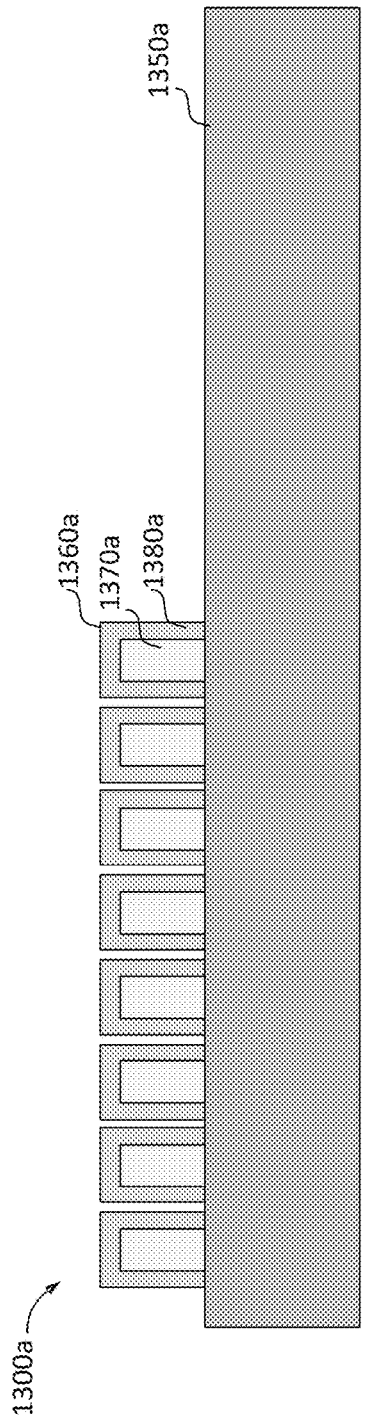
FIG. 13A shows a cross-sectional view of an example DOE that includes a diffraction grating with a coating, according to a first embodiment.
Figure 13B:
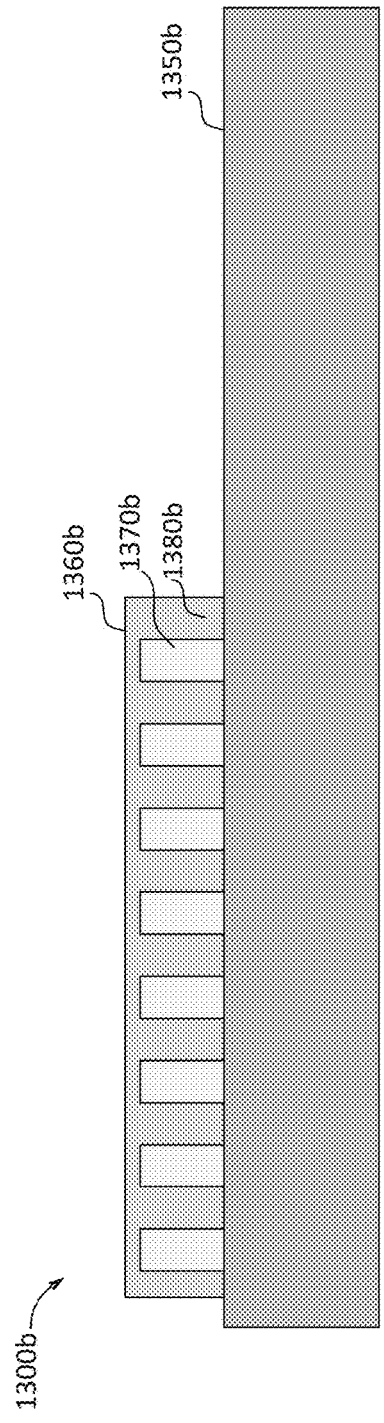
FIG. 13B shows a cross-sectional view of an example DOE that includes a diffraction grating with a coating, according to a second embodiment.

FIGS. 13A and 13B show cross-sectional views of example waveguides 1300a-b at interface that include a coating of high index material intended to improve diffraction efficiency over a wider FOV and range of light wavelengths. As shown in FIGS. 13A and 13B waveguides 130a-b include a substrate 13550a-b (respectively) and DOEs 1360a-b (respectively) that include an SRG structure 1370a-b (respectively). Waveguides 1300a-b can be considered analogous to waveguides 800a-b described with respect to FIGS. 8A and 8B. Similarly, substrates 1350a-b can be considered analogous to substrates 850a-b and DOEs 1360a-b can be considered analogous to DOEs 850a-b as described with respect to FIGS. 8A and 8B. As mentioned, waveguides 1300a-b additionally include a coating of high index material 1380a-1380b over the grating structure 1370a-b (respectively). FIG. 13A shows an embodiment of waveguide 1300a in which the coating material 1380a is applied to the interface surfaces of grating structure 1370a of DOE 1360a. FIG. 13B shows an alternative embodiment in which the grating structure 1370b of DOE 1360b is embedded (at least substantially) in the coating material 1380b. As will be demonstrated, in either embodiment, the application of a coating with a high refractive index to the diffraction grating structure decreases the sensitivity of the component to the angle of incidence and wavelength of light, and hence improves the overall efficiency of the in-coupler/out-coupler.

In some embodiments, coatings 1380a and 1380b are an anti-reflection type coating made of a material such as aluminum dioxide, titanium dioxide, or some combination thereof and have refractive indices up to 2.5. Such coatings can be applied using a number of different industry standard processes such as evaporation, atomic layer deposition (ALD), chemical vapor deposition (CVD), spin coating, and dip coating. Such coating processes are relatively cheap when performed in batch and are suitable for mass manufacturing. Although the selected thickness of coating will depend on the material used and the overall optical configuration of the waveguide, in some embodiments coatings 1380a-b are generally on the order of 50-300 nm thick.

Figure 14:
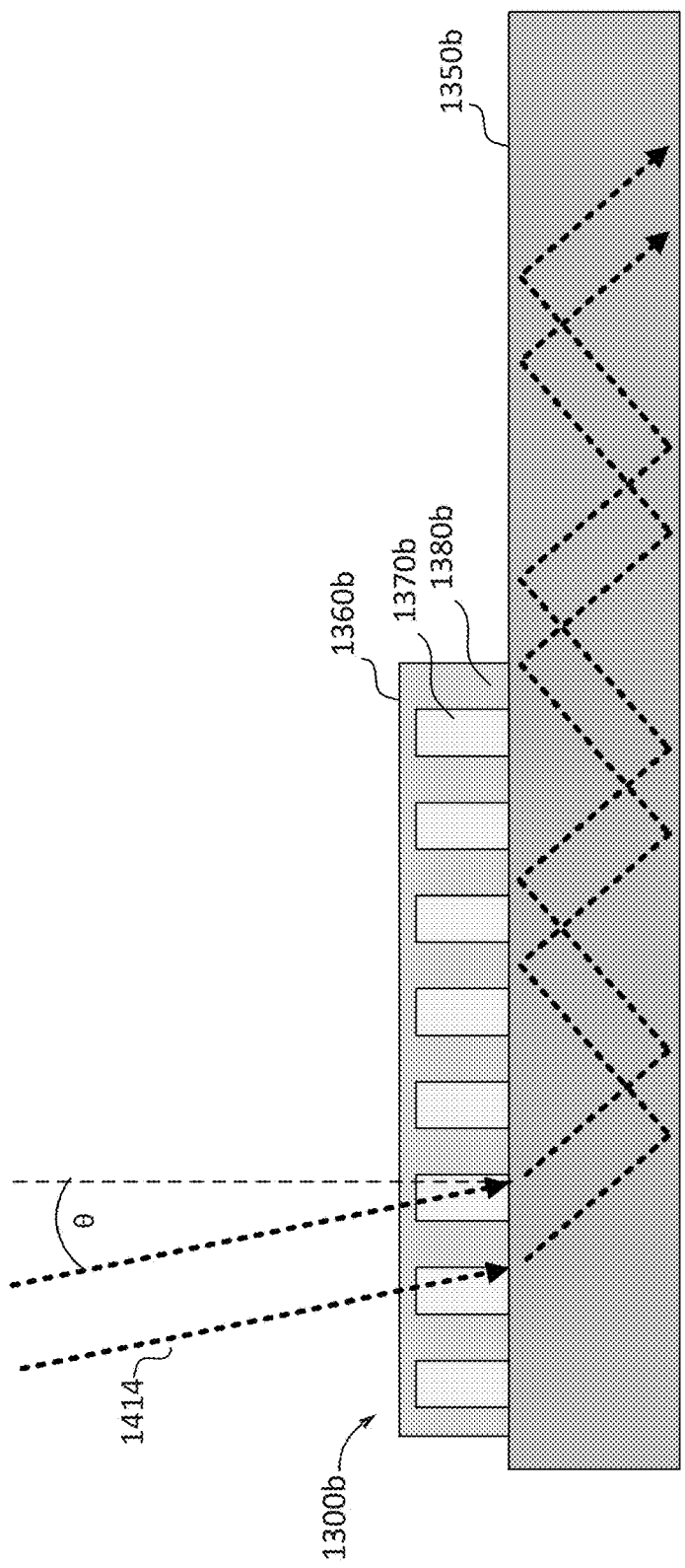
FIG. 14 shows the in-coupling of light rays into substrate via an example DOE that includes a coating.

FIG. 14 shows the in-coupling of light rays 1414 into substrate 1350b via a DOE 1360b of waveguide 1300b. As shown in FIG. 14, light rays 1414 are diffracted and refracted at DOE 1360b and propagate through substrate 1350b by TIR. The out-coupling of light rays 1414 from the substrate 1350b via a second DOE would follow the same principles as illustrated in FIG. 14. The in-coupling of light rays 1414 are shown via waveguide 1300b as described with respect to FIG. 13B, however in-coupling via waveguide 1350a (i.e. with a coating 1380a applied to the interface surface of diffraction grating structure 1360a) would follow the same principles as illustrated in FIG. 14

Figure 15:
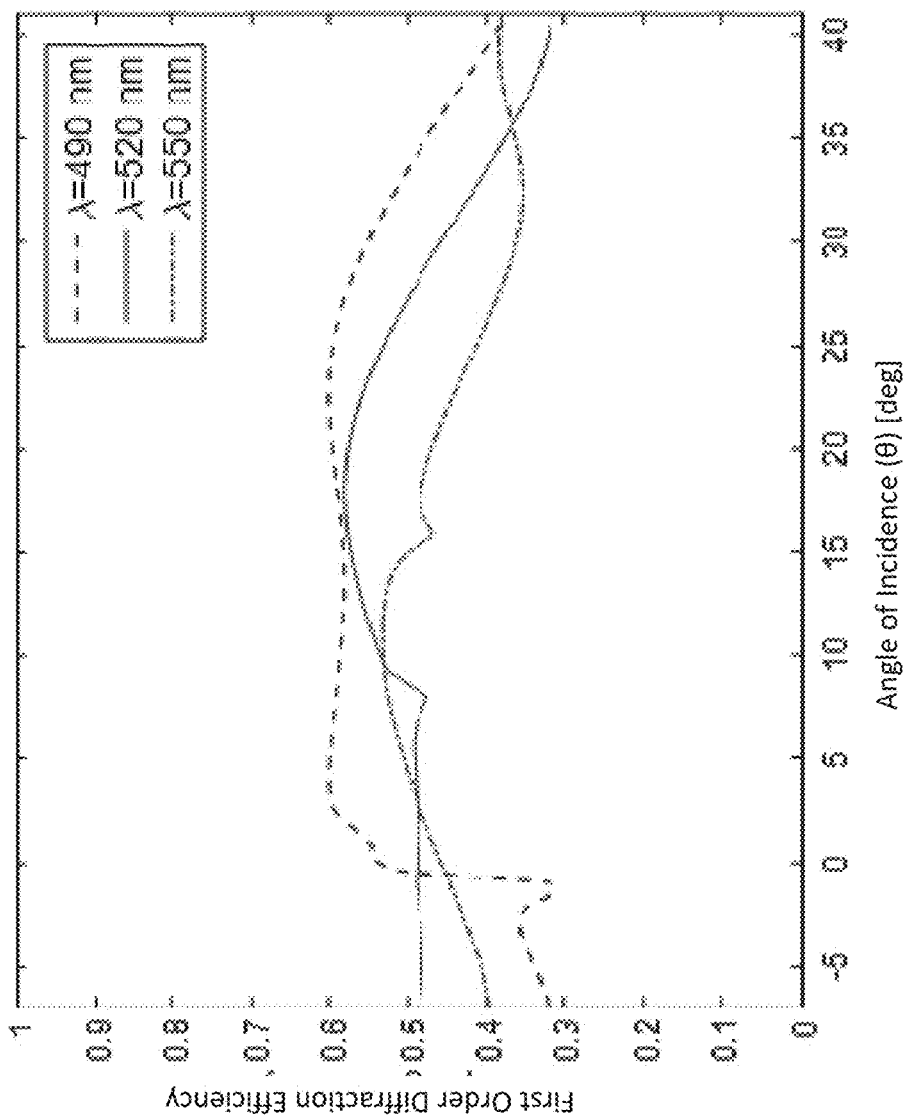
FIG. 15 is a graph that charts first-order diffraction efficiency of an in-coupler DOE with a diffraction grating with a coating over a range of angles of incidence for various wavelengths of light.

FIG. 15 is a graph that charts first-order diffraction efficiency over a range of angles of incidence θ for various wavelengths A of light for an in-coupler DOE with a high index material applied as a coating to a diffraction grating. The example in-coupler (e.g. similar to in-coupler DOE 1360a-b of waveguide 1300a-b) is optimized for a maximal in-coupling over the FOV for light in the 520±30 nm wavelength range. As show in FIG. 15, first order diffraction efficiency remains at between 30% and 60% over a 48° range of angle of incidence θ and 60 nm range of wavelength for diffracted light rays. In practical terms, FIG. 15 demonstrates that a diffraction grating structure with an applied coating of high index material will result in improved image uniformity across a wide FOV.

Figure 16A:
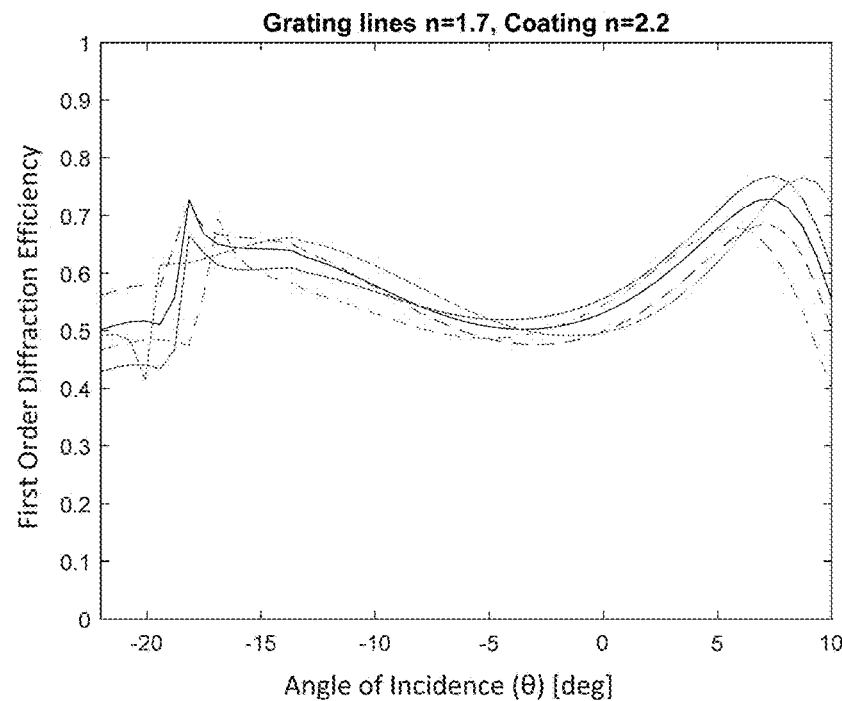
FIG. 16A is a graph that charts first-order diffraction efficiency over a range of angles of incidence for an in-coupler DOE formed on a substrate with a refractive index of 1.7, the DOE including a diffraction grating with a refractive index of 1.7 and a coating of a refractive index of 2.2.
Figure 16B:
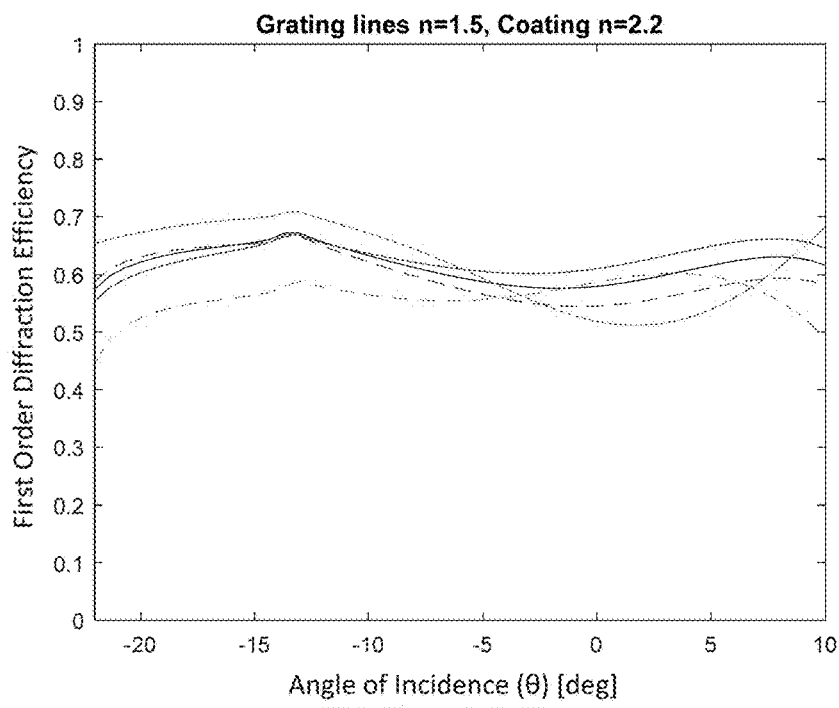
FIG. 16B is a graph that charts first-order diffraction efficiency over a range of angles of incidence for an in-coupler DOE formed on a substrate with a refractive index of 1.5, the DOE including a diffraction grating with a refractive index of 1.7 and a coating of a refractive index of 2.2.

FIGS. 16A and 16B are graphs that chart first-order diffraction efficiency over a range of angles of incidence θ for two different in-coupler DOEs that include a high index coating (n=2.2) applied to diffraction grating structures formed of materials with different refractive indices (n=1.7 and 1.5, respectively). The waveguide tested in both FIGS. 16A and 16B include a substrate made of glass with a refractive index of 1.7 and a grating structure optimized for maximal in-coupling over the FOV for monochromatic green light at ~525 nm wavelength. The diffraction gratings have a period P of 358 nm and are otherwise constrained in other structural parameters as follows: D<450 nm, 0.3<F<0.7, −45°<Φ<+45°. The applied coating has a thickness of ~50 to 100 nm. As shown in FIGS. 16A and 16B, a high refractive index coating (n=2.2) applied to the diffraction grating structure results in relatively high and uniform diffraction efficiency (~50% to 70%) across a 48° range of angle of incidence θ for diffracted light rays. Notably, although the refractive index of the coating material is the same in both FIGS. 16A and 16B, use of the lower index (n=1.5) grating material (as seen in FIG. 16B) yields improved results.

Figure 17A:
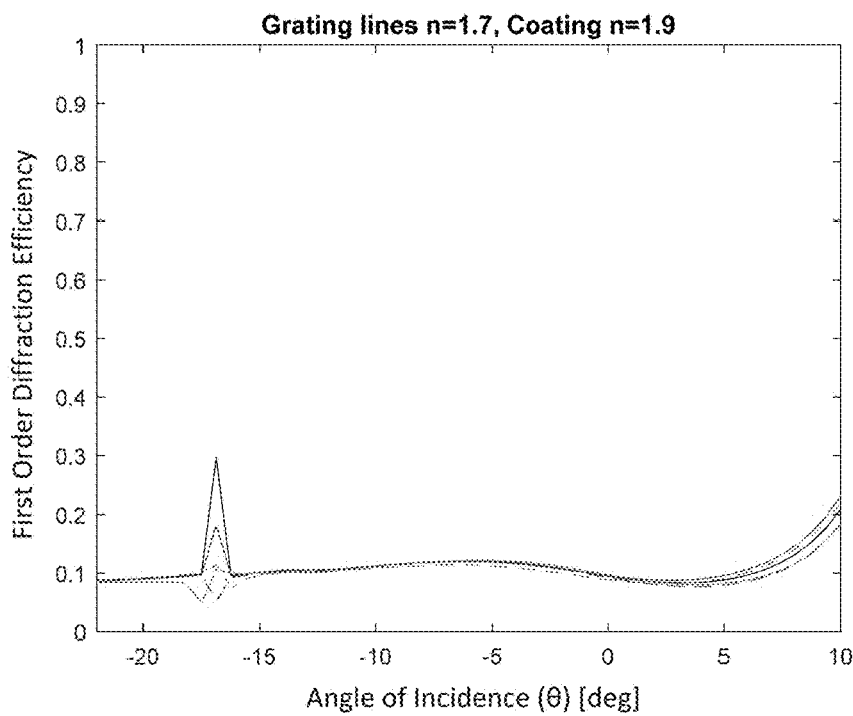
FIG. 17A is a graph that charts first-order diffraction efficiency over a range of angles of incidence for an in-coupler DOE formed on a substrate with a refractive index of 1.7, the DOE including a diffraction grating with a refractive index of 1.7 and a coating of a refractive index of 1.9.
Figure 17B:
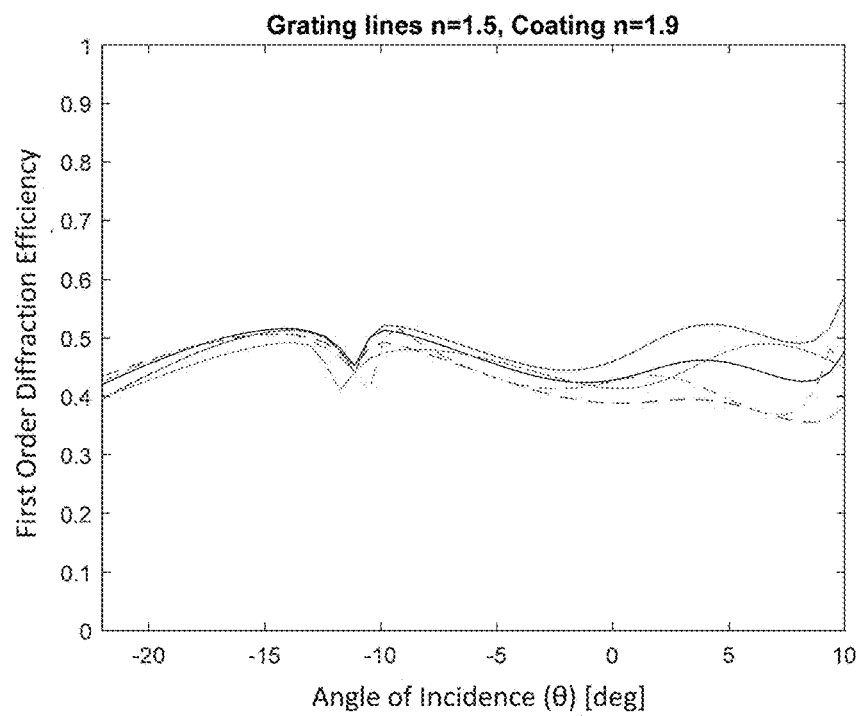
FIG. 17B is a graph that charts first-order diffraction efficiency over a range of angles of incidence for an in-coupler DOE formed on a substrate with a refractive index of 1.7, the DOE including a diffraction grating with a refractive index of 1.5 and a coating of a refractive index of 1.9.

FIGS. 17A and 17B are graphs that chart first-order diffraction efficiency over a range of angles of incidence θ for in-coupler DOEs that are otherwise the same as those tested in FIGS. 16A and 16B (respectively) except that the refractive index of the coating material is lowered from 2.2 to 1.9. A shown in FIGS. 17A and 17B, the diffraction efficiency is still relatively uniform across a 35° range of angle of incidence θ, but is significantly lower than with the higher index coating (~10% to 20% where the diffraction grating material has a refractive index of 1.7 and ~40% to 50% where the diffraction grating material has a refractive index of 1.5.

FIGS. 16A through 17B demonstrate that a key factor in determining the optimal material to apply as a coating is the refractive index of the diffraction grating structure itself. While in general, coatings with higher refractive indices yield increased diffraction efficiency over a FOV, optimal results are achieved where the contrast in refractive index between the diffraction grating material and coating is highest. For example, a relatively small difference (n=0.2) in refractive index between the diffraction grating material (n=1.7) and coating (n=1.9) appeared to yield the worst results (See FIG. 17A) while a relatively large difference (n=0.7) in refractive index between the diffraction grating material (n=1.5) and coating (n=2.2) appeared to yield the best results (See FIG. 16B). In some embodiments, the difference in refractive index between the coating an diffraction grating material in a DOE configured for use with a NED device is at least 0.4.

Figure 18A:
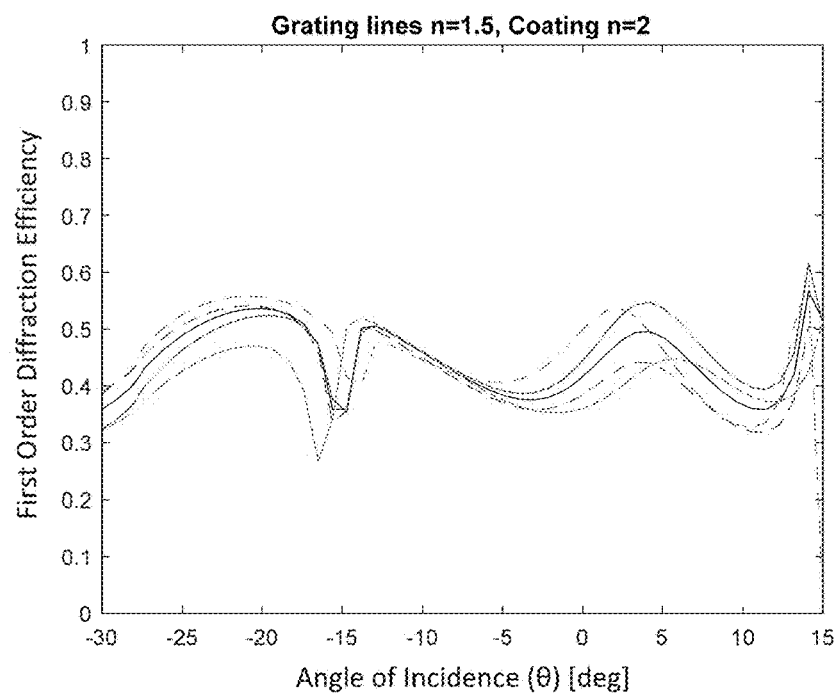
FIG. 18A is a graph that charts first-order diffraction efficiency over a range of angles of incidence for an in-coupler DOE formed on a substrate with a refractive index of 1.9, the DOE including a diffraction grating with a refractive index of 1.5 and a coating of a refractive index of 2.0.
Figure 18B:
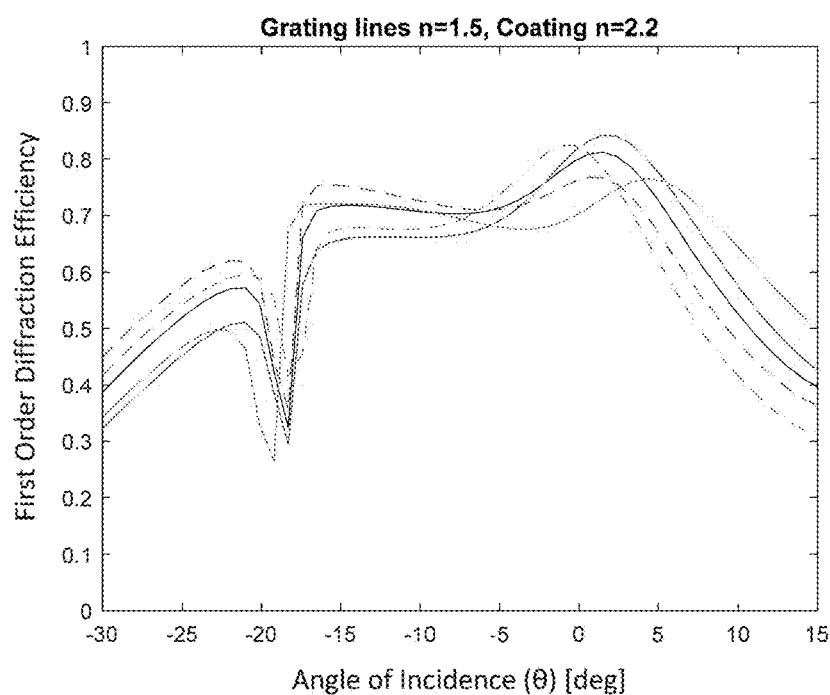
FIG. 18B is a graph that charts first-order diffraction efficiency over a range of angles of incidence for an in-coupler DOE formed on a substrate with a refractive index of 1.9, the DOE including a diffraction grating with a refractive index of 1.5 and a coating of a refractive index of 2.2.

FIGS. 18A and 18B, are graphs that chart first-order diffraction efficiency over a range of angles of incidence θ for two different in-coupler DOEs that both include diffraction grating structures made of relatively low refractive index (n=1.5) that are formed on a glass substrate with a relatively high refractive index (n=1.9). Different coatings are applied to each waveguide, one with a refractive index of 2.0 as shown in FIG. 18A and one with a refractive index of 2.2. as shown in FIG. 18B. As shown in FIGS. 18A and 18B, even though the difference in refractive index between the diffraction grating material and coating is relatively high (0.4 to 0.7), the increased refractive index of the substrate (1.9 as opposed to 1.7) negatively impacts overall diffraction efficiency and/or uniformity across the 35° range of angle of incidence θ. Accordingly, another key factor in determining the optimal material to apply as a coating is the refractive index of the substrate material. Based on the results shown in FIGS. 18A and 18B, increasing the refractive index of the substrate material requires further increasing the refractive index of the coating to optimize diffraction efficiency over a wide field of view.

Figure 19:
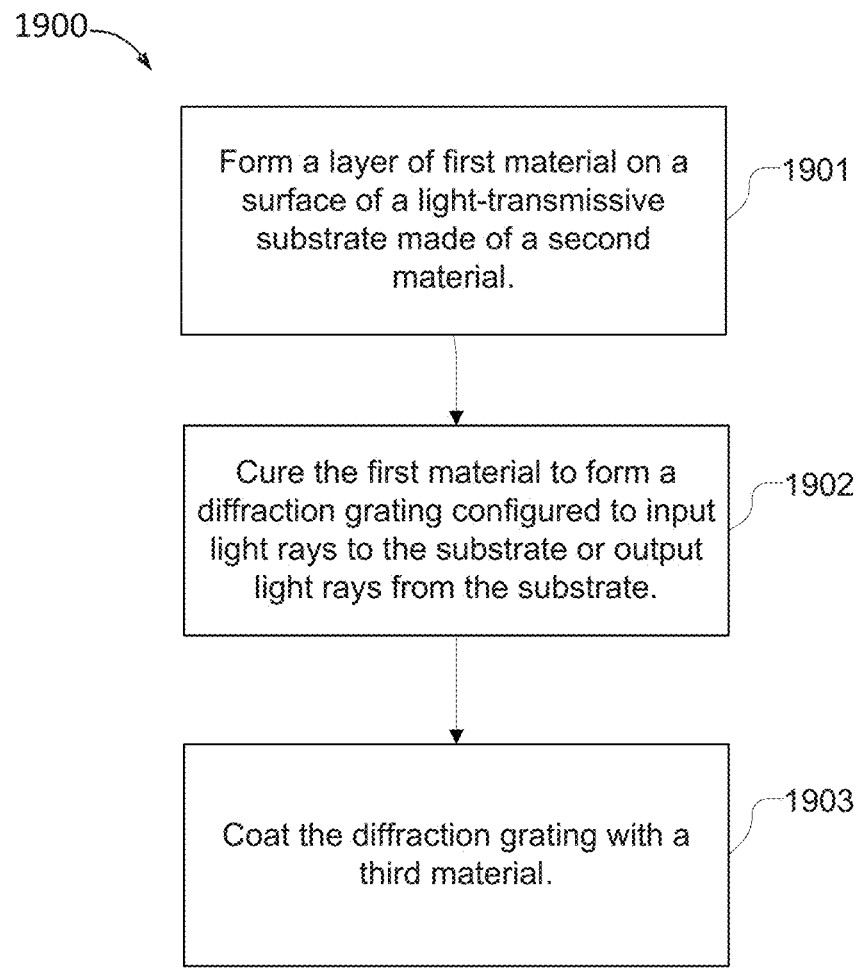
FIG. 19 is a flow chart describing an example process for manufacturing a waveguide configured for use with an NED device that is consistent with the above teachings

FIG. 19 is a flow chart describing an example process 1900 for manufacturing a waveguide configured for use with an NED device that is consistent with the above teachings. As shown in FIG. 19, process 1900 begins at step 1901 with forming a layer of a curable first material (e.g. UV-curable polymer-based resin) on at a surface of a light-transmissive substrate made of a second material (e.g. glass). The process continues at step 1902 with curing the first material to form a diffraction grating on or proximate to the surface of the substrate. In some embodiments, this diffraction grating is configure to input and/or output light rays into and/or out of the substrate. The required curing process will depend on the type of material used. Curing can be performed using number of processes such as application of heat, light, or particular chemicals. The process continues at step 1903 with coating the diffraction grating with a third material (e.g. titanium dioxide and/or aluminum dioxide) that has a higher refractive index than the first material (i.e. applying the high index coating). In some embodiments this coating process is performed using atomic layer deposition and/or chemical vapor deposition.

EXAMPLES OF CERTAIN EMBODIMENTS

Certain embodiments of the technology introduced herein are summarized in the following numbered examples:

1. An optical waveguide including: a light-transmissive substrate configured for use in a near-eye display (NED) device, the substrate including a plurality of internally reflective surfaces, the substrate made of a first material having a first refractive index and a diffractive optical element (DOE) formed on a first surface of the plurality of surfaces of the substrate, the DOE configured to input light rays to the substrate or output light rays from the substrate, the DOE including a diffraction grating made of a second material having a second refractive index and a coating over the diffraction grating made of a third material having a third refractive index, wherein the second refractive index is not equal to the third refractive index.

2. The optical waveguide of example 1, wherein the third refractive index is greater than the second refractive index.

3. The optical waveguide of example 1 or example 2, wherein the coating decreases the sensitivity of the DOE to the wavelength and the angle of incidence of diffracted light rays.

4. The optical waveguide of any of examples 1 through 3, wherein the coating increases uniformity in an image propagated via the DOE across a particular field of view (FOV).

5. The optical waveguide of any of examples 1 through 4, wherein the DOE has a diffraction efficiency of at least 30% over a 30-degree range of angle of incidence for diffracted light rays.

6. The optical waveguide of any of examples 1 through 5, wherein the diffraction grating is optimized to maximize diffraction efficiency over a particular range of angles of incidence of diffracted light rays.

7. The optical waveguide of any of examples 1 through 6, wherein the DOE is an in-coupling element configured to input light rays received from an image generator of the NED device into the substrate.

8. The optical waveguide of any of examples 1 through 6, wherein the DOE is an out-coupling element configured to output light rays from the substrate and to direct the light rays towards an eye of a user of the NED device.

9. The optical waveguide display of any of examples 1 through 8, wherein the diffraction grating is embedded in the coating.

10. The optical waveguide of any of examples 1 through 9, wherein the diffraction grating has been applied to the substrate by a curing process.

11. The optical waveguide display of any of examples 1 through 10, wherein the diffraction grating includes grating structures oriented at an oblique slant angle relative to the first surface of the substrate.

12. The optical waveguide display of any of examples 1 through 11, wherein the first material includes glass.

13. The optical waveguide display of any of examples 1 through 12, wherein the second material includes a UV-curable resin.

14. The optical waveguide display of any of examples 1 through 13, wherein the third refractive index is at least 1.9.

15. The optical waveguide of any of examples 1 through 14, wherein the difference between the second refractive index and the third refractive index is at least 0.4.

16. A near-eye display device including: a light-emitting microdisplay imager configured to emit light rays associated with a generated image and a waveguide, the waveguide including: a light-transmissive substrate configured to propagate light through internal reflection, the substrate made of a first material having a first refractive index; an in-coupling element configured to input light rays received from the microdisplay imager into the substrate; and an out-coupling element configured to output propagated light rays from the substrate and direct the light rays to an eye of a user of the near-eye display device, wherein both the in-coupling element and out-coupling element include a diffractive optical element (DOE) formed on at least a portion of at least one of a plurality of surfaces of the substrate, the DOE including: a diffraction grating made of a second material having a second refractive index and a coating over the diffraction grating made of a third material having a third refractive index, wherein the second refractive index is not equal to the third refractive index.

17. A method of manufacturing a waveguide display, the method including: forming a layer of a curable first material on a surface of a light-transmissive substrate made of a second material; curing the first material to form a diffraction grating on the substrate, the diffraction grating configured to input light rays to the substrate or output light rays from the substrate; and coating the diffraction grating with a third material, wherein the third material has a different refractive index than the first material after the first material has been cured.

18. The method of example 17, wherein coating includes applying the third material to a surface of the diffraction grating using one or more of atomic layer deposition (ALD), chemical vapor deposition (CVD), spin coating, or dip coating.

19. The method of example 17 or 18, wherein the difference between the refractive index of the first material and the refractive index of the third material is at least 0.4

20. The method of any of examples 17 through 19, wherein: the first material includes UV-curable polymer resin, the second material includes glass, and the third material has a refractive index of at least 1.9.

21. A system for manufacturing a waveguide display, the system including: means for forming a layer of a curable first material on a surface of a light-transmissive substrate made of a second material; means for curing the first material to form a diffraction grating on the substrate, the diffraction grating configured to input light rays to the substrate or output light rays from the substrate; and means for coating the diffraction grating with a third material, wherein the third material has a different refractive index than the first material after the first material has been cured.

22. The system of example 21, wherein the means for coating include means for applying the third material to a surface of the diffraction grating using one or more of atomic layer deposition (ALD), chemical vapor deposition (CVD), spin coating, or dip coating.

23. The system of example 21 or example 22, wherein the difference between the refractive index of the first material and the refractive index of the third material is at least 0.4

24. The system of any of examples 21 through 23, wherein: the first material includes UV-curable polymer resin, the second material includes glass, and the third material has a refractive index of at least 1.9.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An optical waveguide, comprising:
   a light-transmissive substrate configured for use in a near-eye display (NED) device, the substrate including, a plurality of internally reflective surfaces, the substrate made of a first material having a first refractive index; and
   a diffractive optical element (DOE) formed on a first surface of the plurality of surfaces of the substrate, the DOE configured to input light rays to the substrate or output light rays from the substrate, the DOE including:
   a diffraction grating made of a second material having a second refractive index; and
   a coating over the diffraction grating made of a third material having a third refractive index;
   wherein the first refractive index is greater than the second refractive index and less than the third refractive index, and the difference between the second refractive index and the third refractive index is at least 0.4.

2. The optical waveguide of claim 1, wherein the third refractive index is greater than the second refractive index.

3. The optical waveguide of claim 1, wherein the coating decreases the sensitivity of the DOE to the wavelength and the angle of incidence of diffracted light rays.

4. The optical waveguide of claim 1, wherein the coating, increases uniformity in an image propagated via the DOE across a particular field of view (FOV).

5. The optical waveguide of claim 1, wherein the DOE has a diffraction efficiency of at least 30% over a 30-degree range of angle of incidence for diffracted light rays.

6. The optical waveguide of claim 1 wherein the diffraction grating is optimized to maximize diffraction efficiency over a particular range of angles of incidence of diffracted light rays.

7. The optical waveguide of claim 1, wherein the DOE is an in-coupling element configured to input light rays received from an image generator of the NED device into the substrate.

8. The optical waveguide of claim 1, wherein the DOE is an out-coupling element configured to output light rays from the substrate and to direct the light rays towards an eye of a user of the NED device.

9. The optical waveguide of claim 1, wherein the diffraction grating is embedded in the coating.

10. The optical waveguide of claim 1 wherein the diffraction grating has been applied to the substrate by a curing process.

11. The optical waveguide of claim 1, wherein the diffraction grating includes grating structures oriented at an oblique slant angle relative to the first surface of the substrate.

12. The optical waveguide of claim 1, wherein the first material comprises glass.

13. The optical waveguide of claim 1, wherein the second material comprises a UV-curable resin.

14. The optical waveguide of claim 1, wherein the third refractive index is at least 1.9.

15. A near-eye display device comprising:
   a light-emitting microdisplay imager configured to emit light rays associated with a generated image; and
   a waveguide including:
      a light-transmissive substrate configured to propagate light through internal reflection, the substrate made of a first material having a first refractive index;
      an in-coupling element configured to input light rays received from the microdisplay imager into the substrate; and
      an out-coupling element configured to output propagated light rays from the substrate and direct the light rays to an eye of a user of the near-eye display device;
   wherein both the in-coupling element and out-coupling element include a diffractive optical element (DOE) formed on at least a portion of at least one of a plurality of surfaces of the substrate, the DOE including:
      a diffraction grating made of a second material having a second refractive index; and
      coating over the diffraction grating made of a third material having a third refractive index;
   wherein first refractive index is greater than the second refractive index and less than the third refractive index, and the difference between the second refractive index and the third refractive index is at least 0.4.

16. A method of manufacturing a waveguide display, comprising:
   forming a layer of a second material on a surface of a light-transmissive substrate made of a first material;
   curing the second material to form a diffraction grating on the substrate, the diffraction grating configured to input light rays to the substrate or output light rays from the substrate; and
   coating the diffraction grating with a third material;
   wherein the third material has a refractive index that is greater than a refractive index of the second material after the second material has been cured, the refractive index of the first material is greater than a refractive index of the second material, and the difference between the refractive index of the second material and the refractive index of the third material is at least 0.4.

17. The method of claim 16, wherein coating includes applying the third material to a surface of the diffraction grating using one or more of atomic layer deposition (ALD), chemical vapor deposition (CVD), spin coating, or dip coating.

18. The method of claim 16, wherein:
   the first material comprises glass;
   the second material comprises UV-curable polymer resin; and
   the third material has a refractive index of at least 1.9.

* * * * *